US012749428B2

(12) United States Patent
Ryu

(10) Patent No.: US 12,749,428 B2
(45) Date of Patent: Sep. 29, 2026

(54) IMAGE DISPLAY APPARATUS CAPABLE OF ENHANCING A GRAYSCALE EXPRESSION POWER WHEN DISPLAYING AN IMAGE

(71) Applicant: LG ELECTRONICS INC., Seoul (KR)

(72) Inventor: Byungwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/264,242

(22) Filed: Jul. 9, 2025

(65) Prior Publication Data

US 2026/0018104 A1 Jan. 15, 2026

(30) Foreign Application Priority Data

Jul. 9, 2024 (KR) ........................ 10-2024-0090215

(51) Int. Cl.
*G09G 3/3283* (2016.01)
*G09G 3/20* (2006.01)

(52) U.S. Cl.
CPC ......... *G09G 3/2092* (2013.01); *G09G 3/3283* (2013.01); *G09G 2300/0842* (2013.01); *G09G 2310/08* (2013.01); *G09G 2340/0435* (2013.01); *G09G 2354/00* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3258; G09G 3/3266; G09G 3/3275; G09G 3/3283; G09G 3/3291; G09G 3/325; G09G 2340/0435
USPC ...................................................... 345/76–83
See application file for complete search history.

(56) References Cited

U.S. PATENT DOCUMENTS 12,073,779 B2 * 8/2024 Chun ..................... G09G 5/008
2006/0066643 A1 3/2006 Arai et al.
2020/0005723 A1 * 1/2020 Kim ..................... G09G 3/3696
2021/0150972 A1 * 5/2021 Lee ........................ G09G 5/391
2022/0084450 A1 * 3/2022 Kim ......................... G09G 3/20
2022/0093048 A1 * 3/2022 Lee ...................... G09G 3/3225
2022/0199005 A1 * 6/2022 Kim ..................... G09G 3/3208
(Continued)

FOREIGN PATENT DOCUMENTS

KR 10-2016-0137216 A 11/2016
KR 10-2018-0076490 A 7/2018
(Continued)

*Primary Examiner* — Ke Xiao
*Assistant Examiner* — Nelson Lam
(74) *Attorney, Agent, or Firm* — Birch, Stewart, Kolasch & Birch, LLP

(57) ABSTRACT

Disclosed is an image display apparatus. An image display apparatus according to an embodiment of the present disclosure includes: a panel; a signal processing device configured to process an input image and output an image signal; and a timing controller configured to drive the panel based on the image signal from the signal processing device, and the signal processing device is configured to output a data enable signal divided into an active period and a blank period, and change a length of the active period or a length of the blank interval in response to a data bit of the image signal being changed. Accordingly, a grayscale expression power when displaying an image can be enhanced.

17 Claims, 22 Drawing Sheets

(56) References Cited

U.S. PATENT DOCUMENTS

| | | | | |
|---|---|---|---|---|
| 2022/0223097 | A1* | 7/2022 | Lee | G09G 3/2096 |
| 2023/0117873 | A1* | 4/2023 | Kim | G09G 3/32<br>345/55 |
| 2023/0142908 | A1* | 5/2023 | Kim | G09G 3/32<br>345/55 |
| 2023/0245625 | A1* | 8/2023 | Lee | G09G 3/3225<br>345/204 |

FOREIGN PATENT DOCUMENTS

| | | | |
|---|---|---|---|
| KR | 10-2019-0098296 | A | 8/2019 |
| KR | 10-2020-0075945 | A | 6/2020 |
| KR | 10-2542826 | B1 | 6/2023 |
| KR | 10-2024-0042707 | A | 4/2024 |

* cited by examiner

FIG. 9B

| | 4Byte Mode | 5Byte Mode |
|---|---|---|
| | RGB (10bit) | RGB (12bit) |
| Byte0 | R[2] | R[4] |
| | R[3] | R[5] |
| | R[4] | R[6] |
| | R[5] | R[7] |
| | R[6] | R[8] |
| | R[7] | R[9] |
| | R[8] | R[10] |
| | R[9] | R[11] |
| Byte1 | G[2] | G[4] |
| | G[3] | G[5] |
| | G[4] | G[6] |
| | G[5] | G[7] |
| | G[6] | G[8] |
| | G[7] | G[9] |
| | G[8] | G[10] |
| | G[9] | G[11] |
| Byte2 | B[2] | B[4] |
| | B[3] | B[5] |
| | B[4] | B[6] |
| | B[5] | B[7] |
| | B[6] | B[8] |
| | B[7] | B[9] |
| | B[8] | B[10] |
| | B[9] | B[11] |
| Byte3 | Don' t care | Don' t care |
| | Don' t care | Don' t care |
| | B[0] | B[2] |
| | B[1] | B[3] |
| | G[0] | G[2] |
| | G[1] | G[3] |
| | R[0] | R[2] |
| | R[1] | R[3] |
| Byte4 | - | - |
| | - | - |
| | - | B[0] |
| | - | B[1] |
| | - | G[0] |
| | - | G[1] |
| | - | R[0] |
| | - | R[1] |

| | Byte Mode | Horizontal | | | Vertical | | | | |
|---|---|---|---|---|---|---|---|---|---|
| | | Hactive | Hblank | Total | Vactive | Vblank | Total | Pixel Clock (MHz) | Vx1 frequency (GHz) |
| 120Hz | 4byte | 240 | 35 | 275 | 2160 | 90 | 2250 | 74.25 | 2.97 |
| | 5byte | 240 | 35 | 275 | 2160 | 90 | 2250 | | 3.712 |
| 144Hz | 4byte | 240 | 35 | 275 | 2160 | 90 | 2250 | 89.1 | 3.564 |
| | 5byte | 240 | 35 | 275 | 2160 | 90 | 2250 | | 4.455 |

FIG. 11A

| | Horizontal | | | Vertical | | | Pixel Clock (MHz) |
|---|---|---|---|---|---|---|---|
| | Hactive | Hblank | Total | Vactive | Vblank | Total | |
| 10bit | 240 | 90 | 330 | 2160 | 90 | 2250 | 89.1 |
| 11bit | 248 | 82 | 330 | 2160 | 90 | 2250 | |
| 12bit | 272 | 58 | 330 | 2160 | 90 | 2250 | |
| 13bit | 296 | 34 | 330 | 2160 | 90 | 2250 | |
| 14bit | 320 | 10 | 330 | 2160 | 90 | 2250 | |

| | Horizontal | | | Vertical | | | Pixel Clock (MHz) |
|---|---|---|---|---|---|---|---|
| | Hactive | Hblank | Total | Vactive | Vblank | Total | |
| 10bit | 240 | 35 | 275 | 2160 | 90 | 2250 | 89.1 |
| 11bit | 248 | 27 | 275 | 2160 | 90 | 2250 | |
| 12bit | 272 | 3 | 275 | 2160 | 90 | 2250 | |

FIG. 13A

< 10bit >

240x16lane
3840(RGB:10bit)

| 4btye Mode | | RGB (data) |
|---|---|---|
| Byte0 | bit[0] | Rn[2] |
| | bit[1] | Rn[3] |
| | bit[2] | Rn[4] |
| | bit[3] | Rn[5] |
| | bit[4] | Rn[6] |
| | bit[5] | Rn[7] |
| | bit[6] | Rn[8] |
| | bit[7] | Rn[2] |
| Byte1 | bit[8] | Gn[3] |
| | bit[9] | Gn[3] |
| | bit[10] | Gn[4] |
| | bit[11] | Gn[5] |
| | bit[12] | Gn[6] |
| | bit[13] | Gn[7] |
| | bit[14] | Gn[8] |
| | bit[15] | Gn[9] |
| Byte2 | bit[16] | Bn[2] |
| | bit[17] | Bn[3] |
| | bit[18] | Bn[4] |
| | bit[19] | Bn[5] |
| | bit[20] | Bn[6] |
| | bit[21] | Bn[7] |
| | bit[22] | Bn[8] |
| | bit[23] | Bn[9] |
| Byte3 | bit[24] | Don't Care |
| | bit[25] | Don't Care |
| | bit[26] | Bn[0] |
| | bit[27] | Bn[1] |
| | bit[28] | Gn[0] |
| | bit[29] | Gn[1] |
| | bit[30] | Rn[0] |
| | bit[31] | Rn[1] |

(a)

< 11bit >

240x16lane
3840(R:10bit+GB:11bit)

R 1bit: 240 x 16lane
3840

| 4btye Mode | | RGB (data) | DE 241 | ~ | DE 249 |
|---|---|---|---|---|---|
| Byte0 | bit[0] | Rn[3] | R0[0] | | R0[224] |
| | bit[1] | Rn[4] | R0[1] | | R0[225] |
| | bit[2] | Rn[5] | R0[2] | | R0[226] |
| | bit[3] | Rn[6] | R0[3] | | R0[227] |
| | bit[4] | Rn[7] | R0[4] | | R0[228] |
| | bit[5] | Rn[8] | R0[5] | | R0[229] |
| | bit[6] | Rn[9] | R0[6] | | R0[230] |
| | bit[7] | Rn[10] | R0[7] | | R0[231] |
| Byte1 | bit[8] | Gn[3] | R0[8] | | R0[232] |
| | bit[9] | Gn[4] | R0[9] | | R0[233] |
| | bit[10] | Gn[5] | R0[10] | | R0[234] |
| | bit[11] | Gn[6] | R0[11] | | R0[235] |
| | bit[12] | Gn[7] | R0[12] | | R0[236] |
| | bit[13] | Gn[8] | R0[13] | | R0[237] |
| | bit[14] | Gn[9] | R0[14] | | R0[238] |
| | bit[15] | Gn[10] | R0[15] | | R0[239] |
| Byte2 | bit[16] | Bn[3] | R0[16] | | |
| | bit[17] | Bn[4] | R0[17] | | |
| | bit[18] | Bn[5] | R0[18] | | |
| | bit[19] | Bn[6] | R0[19] | | |
| | bit[20] | Bn[7] | R0[20] | | |
| | bit[21] | Bn[8] | R0[21] | | |
| | bit[22] | Bn[9] | R0[22] | | |
| | bit[23] | Bn[10] | R0[23] | | |
| Byte3 | bit[24] | Bn[0] | R0[24] | | |
| | bit[25] | Gn[0] | R0[25] | | |
| | bit[26] | Bn[1] | R0[26] | | |
| | bit[27] | Bn[2] | R0[27] | | |
| | bit[28] | Gn[1] | R0[28] | | |
| | bit[29] | Gn[2] | R0[29] | | |
| | bit[30] | Rn[1] | R0[30] | | |
| | bit[31] | Rn[2] | R0[31] | | |

(b)

FIG. 13B

240x16lane 3840(R:10bit+GB:11bit)

R 1bit: 240 x 16lane 3840

RGB : + 1bit 240x 16lane : 3840

| 4btye Mode | | RGB (data) | DE 241 | ~ | DE 249 | DE 241 | ~ | DE 256 | DE 264 | ~ | DE 256 | DE 241 | ~ | DE 249 |
|---|---|---|---|---|---|---|---|---|---|---|---|---|---|---|
| Byte0 | bit[0] | Rn[3] | R0[0] | | R0[224] | B0[0] | | B0[224] | G0[0] | | G0[224] | R0[0] | | R0[224] |
| | bit[1] | Rn[4] | R0[1] | | R0[225] | B0[1] | | B0[225] | G0[1] | | G0[225] | R0[1] | | R0[225] |
| | bit[2] | Rn[5] | R0[2] | | R0[226] | B0[2] | | B0[226] | G0[2] | | G0[226] | R0[2] | | R0[226] |
| | bit[3] | Rn[6] | R0[3] | | R0[227] | B0[3] | | B0[227] | G0[3] | | G0[227] | R0[3] | | R0[227] |
| | bit[4] | Rn[7] | R0[4] | | R0[228] | B0[4] | | B0[228] | G0[4] | | G0[228] | R0[4] | | R0[228] |
| | bit[5] | Rn[8] | R0[5] | | R0[229] | B0[5] | | B0[229] | G0[5] | | G0[229] | R0[5] | | R0[229] |
| | bit[6] | Rn[9] | R0[6] | | R0[230] | B0[6] | | B0[230] | G0[6] | | G0[230] | R0[6] | | R0[230] |
| | bit[7] | Rn[10] | R0[7] | | R0[231] | B0[7] | | B0[231] | G0[7] | | G0[231] | R0[7] | | R0[231] |
| Byte1 | bit[8] | Gn[3] | R0[8] | | R0[232] | B0[8] | | B0[232] | G0[8] | | G0[232] | R0[8] | | R0[232] |
| | bit[9] | Gn[4] | R0[9] | | R0[233] | B0[9] | | B0[233] | G0[9] | | G0[233] | R0[9] | | R0[233] |
| | bit[10] | Gn[5] | R0[10] | | R0[234] | B0[10] | | B0[234] | G0[10] | | G0[234] | R0[10] | | R0[234] |
| | bit[11] | Gn[6] | R0[11] | | R0[235] | B0[11] | | B0[235] | G0[11] | | G0[235] | R0[11] | | R0[235] |
| | bit[12] | Gn[7] | R0[12] | | R0[236] | B0[12] | | B0[236] | G0[12] | | G0[236] | R0[12] | | R0[236] |
| | bit[13] | Gn[8] | R0[13] | | R0[237] | B0[13] | | B0[237] | G0[13] | | G0[237] | R0[13] | | R0[237] |
| | bit[14] | Gn[9] | R0[14] | | R0[238] | B0[14] | | B0[238] | G0[14] | | G0[238] | R0[14] | | R0[238] |
| | bit[15] | Gn[10] | R0[15] | | R0[239] | B0[15] | | B0[239] | G0[15] | | G0[239] | R0[15] | | R0[239] |
| Byte2 | bit[16] | Bn[3] | R0[16] | | | B0[16] | | | G0[16] | | | R0[16] | | |
| | bit[17] | Bn[4] | R0[17] | | | B0[17] | | | G0[17] | | | R0[17] | | |
| | bit[18] | Bn[5] | R0[18] | | | B0[18] | | | G0[18] | | | R0[18] | | |
| | bit[19] | Bn[6] | R0[19] | | | B0[19] | | | G0[19] | | | R0[19] | | |
| | bit[20] | Bn[7] | R0[20] | | | B0[20] | | | G0[20] | | | R0[20] | | |
| | bit[21] | Bn[8] | R0[21] | | | B0[21] | | | G0[21] | | | R0[21] | | |
| | bit[22] | Bn[9] | R0[22] | | | B0[22] | | | G0[22] | | | R0[22] | | |
| | bit[23] | Bn[10] | R0[23] | | | B0[23] | | | G0[23] | | | R0[23] | | |
| Byte3 | bit[24] | Bn[0] | R0[24] | | | B0[24] | | | G0[24] | | | R0[24] | | |
| | bit[25] | Gn[0] | R0[25] | | | B0[25] | | | G0[25] | | | R0[25] | | |
| | bit[26] | Bn[1] | R0[26] | | | B0[26] | | | G0[26] | | | R0[26] | | |
| | bit[27] | Bn[2] | R0[27] | | | B0[27] | | | G0[27] | | | R0[27] | | |
| | bit[28] | Gn[1] | R0[28] | | | B0[28] | | | G0[28] | | | R0[28] | | |
| | bit[29] | Gn[2] | R0[29] | | | B0[29] | | | G0[29] | | | R0[29] | | |
| | bit[30] | Rn[1] | R0[30] | | | B0[30] | | | G0[30] | | | R0[30] | | |
| | bit[31] | Rn[2] | R0[31] | | | B0[31] | | | G0[31] | | | R0[31] | | |

IMAGE DISPLAY APPARATUS CAPABLE OF ENHANCING A GRAYSCALE EXPRESSION POWER WHEN DISPLAYING AN IMAGE

CROSS-REFERENCE TO THE RELATED APPLICATION

This application claims priority from Korean Patent Application No. 10-2024-0090215, filed on 9 Jul. 2024, in the Korean Intellectual Property Office, the disclosure of which is incorporated herein by reference in its entirety.

BACKGROUND

1. Field

The present disclosure relates to an image display apparatus, and more specifically, to an image display apparatus capable of enhancing a grayscale expression power when displaying an image.

2. Description of the Related Art

An image display apparatus is an apparatus that displays an image.

According to the recent increase in image resolution, there is a trend in which a display resolution or peak luminance of the image displayed in the image display apparatus.

Accordingly, when transmitting an image signal signal-processed by the image display apparatus, raising a data bit is required.

Meanwhile, due to a limit in transmissions frequency, there is a problem in that there is a limit in raising the data bit of an image signal.

SUMMARY

An object of the present disclosure is to provide an image display apparatus capable of enhancing a grayscale expression power when displaying an image.

Another object of the present disclosure is to provide an image display apparatus capable of enhancing the grayscale expression power when displaying the image by changing a data enable signal based on an image display mode.

Yet another object of the present disclosure is to provide an image display apparatus capable of enhancing the grayscale expression power when displaying a data bit of an image signal based on a frequency of a vertical synchronization signal.

Still yet another object of the present disclosure is to provide an image display apparatus capable of enhancing the grayscale expression power when displaying the image without changing a transmission lane of the image signal.

In accordance with an embodiment of the present disclosure, the above and other objects can be accomplished by the provision of an image display apparatus including: a panel; a signal processing device configured to process an input image and output an image signal; and a timing controller configured to drive the panel based on the image signal from the signal processing device, wherein the signal processing device is configured to output a data enable signal divided into an active period and a blank period, and change a length of the active period or a length of the blank interval in response to a data bit of the image signal being changed.

Meanwhile, the signal processing device can be configured to output a first data enable signal corresponding to a first active period and a first blank period in response to an image display mode being a normal mode, and output a second data enable signal corresponding to a second active period and a second blank period in response to the image display mode being a game mode, and a length of the second active period can be greater than a length of the first active period and a length of the second blank period can be less than a length of the first blank period.

Meanwhile, the signal processing device can be configured to output the first data enable signal corresponding to the first active period and the first blank period to display an image having a peak luminance of a first level in the panel, and output the second data enable signal corresponding to the second active period and the second blank period to display an image having a peak luminance of a second level higher than the first level in the panel, and the length of the second active period can be greater than the length of the first active period and the length of the second blank period can be less than the length of the first blank period.

Meanwhile, the signal processing device can be configured to output a first data enable signal corresponding to frequency a of a first vertical synchronization signal, and in response to the data bit of the image signal being one of a first bit, a second bit, a third bit, a fourth bit, and a fifth bit, set a length of the active period or a length of the blank corresponding to the corresponding bit.

Meanwhile, the signal processing device can be configured to, in response to a frequency of a vertical synchronization signal corresponding to the frequency of the first vertical synchronization signal, set a length of the active period or a length of the blank period in which the data bit of the image signal corresponds to one of a first number of bits, and in response to the frequency of the vertical synchronization signal corresponding to a frequency of a second vertical synchronization signal higher than the frequency of the first vertical synchronization signal, set a length of the active period or a length of the blank period in which the data bit of the image signal corresponds to one of bits of a second number less than the first number.

Meanwhile, the signal processing device can be configured to output a second data enable signal corresponding to the frequency of the second vertical synchronization signal, and in response to the data bit of the image signal being one of the first bit, the second bit, and the third bit, set a length of the active period or a length of the blank corresponding to the corresponding bit.

Meanwhile, the signal processing device can be configured to decrease the length of the blank period of the data enable signal as the frequency of the vertical synchronization signal increases.

Meanwhile, the signal processing device can be configured to increase the length of the active period of the data enable signal or decrease the length of the blank period as the data bit of the image signal increases.

Meanwhile, the signal processing device is configured to change the length of the active period or the length of the blank period in response to a data enable variation mode.

Meanwhile, the signal processing device can be configured to fix the length of the active period or the length of the blank period in response to a data enable fixation mode.

Meanwhile, the signal processing device can be configured to output the image signal including R, G, and B data in response to the length of the active period of the data enable signal.

Meanwhile, the signal processing device can be configured to increase a data bit of the R, G, and B data as the length of the active period of the data enable signal increases.

In accordance with another embodiment of the present disclosure, the above and other objects can be accomplished by the provision of an image display apparatus including: a panel; a signal processing device configured to process an input image and output an image signal; and a timing controller configured to drive the panel based on the image signal from the signal processing device, wherein the signal processing device is configured to output a first data enable signal corresponding to a first active period and a first blank period in response to an image display mode being a normal mode, and output a second data enable signal corresponding to a second active period and a second blank period in response to the image display mode being a game mode, and a length of the second active period is greater than a length of the first active period and a length of the second blank period is less than a length of the first blank period.

Meanwhile, the signal processing device can be configured to control a data bit of R, G, and B data output in response to the game mode to be greater than a data bit of R, G, and B data output in response to the normal mode.

Meanwhile, the signal processing device can be configured to output the second data enable signal corresponding to the second active period and the second blank period in response to the image display mode being the game mode and a vertical a frequency of synchronization signal corresponding to a first vertical synchronization signal, and output a third data enable signal corresponding to a third active period and a third blank period in response to the image display mode being the game mode and the frequency of the vertical synchronization signal corresponding to a frequency of a second vertical synchronization signal higher than the frequency of the first vertical synchronization signal, and a length of the third active period can be greater than the length of the first active period and a length of the third blank period can be less than the length of the second blank period.

In accordance with yet another embodiment of the present disclosure, the above and other objects can be accomplished by the provision of an image display apparatus including: a panel; a signal processing device configured to process an input image and output an image signal; and a timing controller configured to drive the panel based on the image signal from the signal processing device, wherein the signal processing device is configured to output a data enable signal divided into an active period and a blank period, change a length of the active period or a length of the blank period in response to a data enable variation mode, and fix the length of the active period or the length of the blank period in response to a data enable fixation mode.

Meanwhile, the signal processing device can be configured to output a first data enable signal corresponding to a first active period and a first blank period in response to the data enable variation mode and an image display mode being a normal mode, and output a second data enable signal corresponding to a second active period and a second blank period in response to the data enable variation mode and the image display mode being a game mode, and a length of the second active period can be greater than a length of the first active period and a length of the second blank period can be less than a length of the first blank period.

Meanwhile, in response to the data enable variation model, the signal processing device can be configured to output a first data enable signal corresponding to a frequency of a first vertical synchronization signal, and in response to the data bit of the image signal being one of a first bit, a second bit, a third bit, a fourth bit, and a fifth bit, set a length of the active period or a length of the blank corresponding to the corresponding bit.

BRIEF DESCRIPTION OF THE DRAWINGS

The above and other objects, features and other advantages of the present disclosure will be more clearly understood from the following detailed description taken in conjunction with the accompanying drawings, in which:

FIGS. 9A to 9C are diagrams referred to in the description of an operation of an image display apparatus related to the present disclosure;

FIG. 10A is a flowchart showing an example of an operating method of an image display apparatus according to an embodiment of the present disclosure;

FIGS. 11A to 14B are diagrams referred to in the description of FIGS. 10A to 10D.

DETAILED DESCRIPTION OF THE PREFERRED EMBODIMENTS

Hereinafter, the present disclosure will be described in detail with reference to the accompanying drawings.

Regarding constituent elements used in the following description, suffixes “module” and “unit” are given only in consideration of ease in the preparation of the specification, and do not have or serve as different meanings. Accordingly, the suffixes “module” and “unit” can be used interchangeably.

Figure 1:
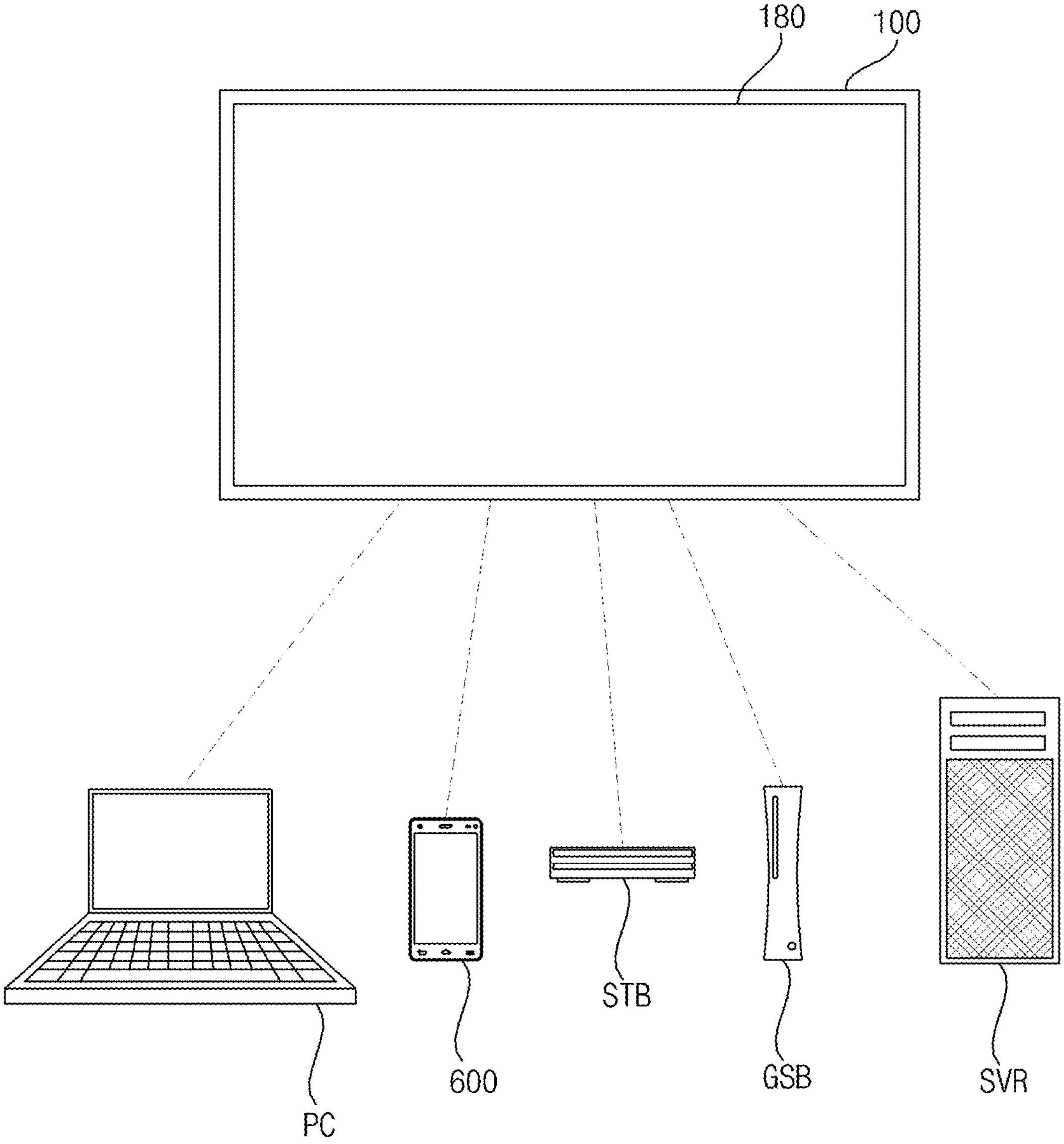
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 can include a display 180.

The image display apparatus 100 can receive image signals from various external devices, process the image signals and display the processed image signals on the display 180.

The various external devices can be, for example, a mobile terminal 600 such as a computer (PC) or a smartphone, a set-top box (STB), a game console (GSB), a server (SVR), and the like.

The display 180 can be implemented as one of various panels. For example, the display 180 can be one of spontaneous emission panels such as an organic light emitting diode panel (OLED panel), an inorganic LED panel, and a micro LED panel.

In the present disclosure, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that a signal processor 170 (see FIG. 2) of the image display apparatus 100 perform image quality processing for the OLED panel.

Meanwhile, the display 180 can include a panel and a timing controller, and the panel can display an image according to signal processing of the timing controller.

In a case where a memory used in the timing controller when an image signal is output to the panel, the image signal can be output to the panel using data stored in the memory.

In a case where the timing controller does not use a memory or does not include a memory for the purpose of achieving a slim timing controller, the amount of processed signals increases in the timing controller and, particularly, the amount of processed signals further increases when the resolution of an image increases.

Accordingly, the present disclosure proposes a method by which the timing controller can accurately and rapidly perform signal processing for the panel when a memory is not used or seldom used for realizing a slim timing controller.

To this end, the present disclosure proposes a method of additionally configured to output second image frame data downscaled based on a received image in addition to performing signal processing on the received image and output signal-processed first frame image data.

The image display apparatus 100 according to an embodiment of the present disclosure can include a signal processing device 170 which outputs image frame data ImgL delayed from second image frame data ImgS, a timing controller 232 which performs signal processing based on an image signal output from the signal processing device 170, and a panel 210 which displays an image based on a signal from the timing controller 232. Accordingly, the timing controller 232 can accurately and rapidly perform signal processing for the panel 210.

Meanwhile, the signal processing device 170 in the image display apparatus 100 according to an embodiment of the present disclosure includes an input interface IIP configured to receive an image signal from the outside, a first image processor 1010 configured to generate first image frame data ImgL based on the image signal, a second image processor 1020 configured to generate second image frame data ImgS scaling-down compared to the first image frame data ImgL based on the image signal, and an output interface OIP configured to receive the first image frame data ImgL from the first image processor 1010 and the second image frame data ImgS from the second image processor 1020, and output the first image frame data ImgL and the second image frame data ImgS, and the first image frame data ImgL output from the output interface OIP is delayed further than the second image frame data ImgS, and output. Accordingly, a signal can be output to enable accurate and rapid signal processing in a timing controller. Meanwhile, the timing controller can accurately and rapidly perform signal processing for the first image frame data ImgL delayed and output based on the second image frame data ImgS. In particular, the timing controller can accurately and rapidly perform signal processing for reducing power consumption.

Meanwhile, the signal processing device 170 in the image display apparatus 100 according to another embodiment of the present disclosure includes an input interface IIP configured to receive an image signal from the outside, a first image processor 1010 configured to generate first image frame data ImgL based on the image signal, a second image processor 1020 configured to generate image frame data based on the image signal, and an output interface OIP configured to output a data enable signal DE divided into an active period HA and a blank period HB, a data signal of the first image frame data ImgL, and a data signal of the second image frame data ImgS, and the output interface OIP sets the active period HA of the first data enable signaled to a first length Wa when only the data signal of the first image frame data ImgL is output, and sets the active period HA of the second data enable signal DE to a second length Wb greater than the first length Wa when the data signal of the first image frame data ImgL and the data signal of the second image frame data ImgS are output jointly. Accordingly, a signal can be output to enable accurate and rapid signal processing in a timing controller.

Meanwhile, the image display apparatus 100 of FIG. 1 can be a TV receiver, a monitor, a tablet, a mobile terminal, a vehicle display device, or the like.

Figure 2:
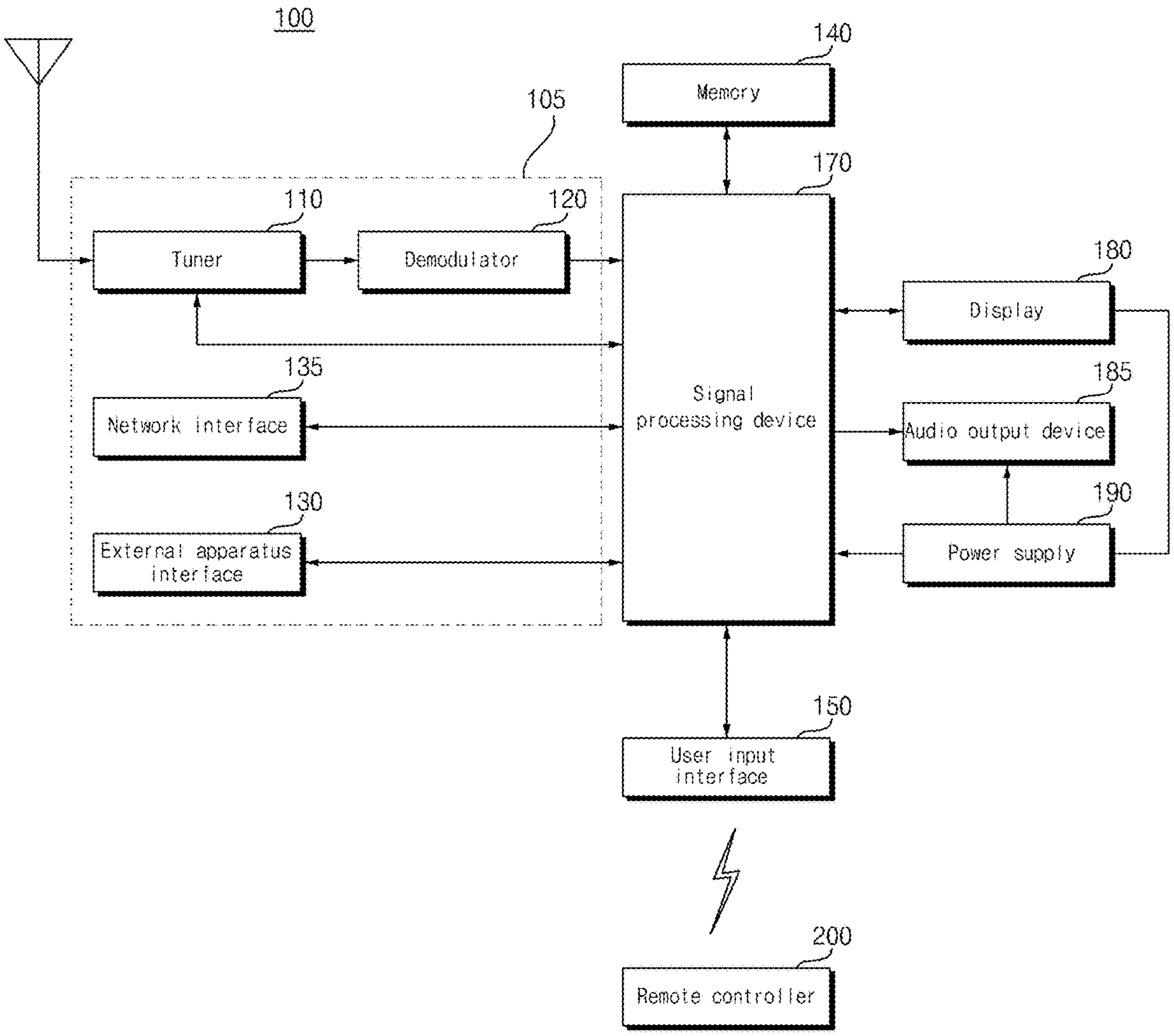
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output device 185.

The image receiver 105 can include a tuner 110, a demodulator 120, a network interface 135, and an external apparatus interface 130.

Meanwhile, unlike the figure, the image receiver 105 can include only the tuner 110, the demodulator 120, and the external apparatus interface 130. That is, the network interface 135 can not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, the tuner 110 converts the selected RF broadcast signal into a digital IF signal (DIF) when the selected RF broadcast signal is a digital broadcast signal, and converts the selected RF broadcast signal into an analog baseband image or voice signal (CVBS/SIF) when the selected RF broadcast signal is an analog broadcast signal. That is, the tuner 110 can process the digital broadcast signal or the analog broadcast signal. The analog baseband image or voice signal (CVBS/SIF) outputted from the tuner 110 can be directly inputted into the signal processing device 170.

Meanwhile, the tuner 110 can include a plurality of tuners configured to receive broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 can perform demodulation and channel decoding and then output a stream signal TS. At this time, the stream signal can be a multiplexed signal of an image signal, an audio signal, or a data signal.

The stream signal output from the demodulator 120 can be input to the signal processor 170. The signal processor 170 performs demultiplexing, image/audio signal processing, and the like, and then outputs an image to the display 180 and outputs audio to the audio output device 185.

The external apparatus interface 130 can be configured to transmit or receive data with a connected external apparatus (not shown), e.g., a set-top box STB. To this end, the external apparatus interface 130 can include an A/V input and output device (not shown).

The external apparatus interface 130 can be connected in wired or wirelessly to an external apparatus such as a digital versatile disk (DVD), a Blu ray, a game equipment, a camera, a camcorder, a computer (note book), and a set-top box, and can perform an input/output operation with an external apparatus.

The A/V input and output device can receive image and audio signals from an external apparatus. Meanwhile, a wireless transceiver (not shown) can perform short-range wireless communication with other electronic apparatus.

Through the wireless transceiver (not shown), the external apparatus interface 130 can exchange data with an adjacent mobile terminal 600. In particular, in a mirroring mode, the external apparatus interface 130 can receive device information, executed application information, application image, and the like from the mobile terminal 600.

The network interface 135 provides an interface for connecting the image display apparatus 100 to a wired/wireless network including the Internet network. For example, the network interface 135 can receive, via the network, content or data provided by the Internet, a content provider, or a network operator.

Meanwhile, the network interface 135 can include a wireless transceiver (not shown).

The memory 140 can store a program for each signal processing and control in the signal processor 170, and can store signal-processed image, audio, or data signal.

In addition, the memory 140 can serve to temporarily store image, audio, or data signal input to the external apparatus interface 130. In addition, the memory 140 can store information on a certain broadcast channel through a channel memory function such as a channel map.

Although FIG. 2 illustrates that the memory is provided separately from the signal processor 170, the scope of the present disclosure is not limited thereto. The memory 140 can be included in the signal processor 170.

The user input interface 150 transmits a signal input by the user to the signal processor 170 or transmits a signal from the signal processor 170 to the user.

For example, it can be configured to transmit/receive a user input signal such as power on/off, channel selection, screen setting, etc., from a remote controller 200, can transfer a user input signal input from a local key (not shown) such as a power key, a channel key, a volume key, a set value, etc., to the signal processor 170, can transfer a user input signal input from a sensor device (not shown) that senses a user's gesture to the signal processor 170, or can be configured to transmit a signal from the signal processor 170 to the sensor device (not shown).

The signal processor 170 can demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and can be displayed as an image corresponding to the image signal. In addition, the image signal processed by the signal processor 170 can be input to the external output apparatus through the external apparatus interface 130.

The audio signal processed by the signal processor 170 can be output to the audio output device 185 as an audio signal. In addition, audio signal processed by the signal processor 170 can be input to the external output apparatus through the external apparatus interface 130.

Although not shown in FIG. 2, the signal processor 170 can include a demultiplexer, an image processor, and the like. That is, the signal processor 170 can perform a variety of signal processing and thus it can be implemented in the form of a system on chip (SOC). This will be described later with reference to FIG. 3.

In addition, the signal processor 170 can control the overall operation of the image display apparatus 100. For example, the signal processor 170 can control the tuner 110 to control the tuning of the RF broadcast corresponding to the channel selected by the user or the previously stored channel.

In addition, the signal processor 170 can control the image display apparatus 100 according to a user command input through the user input interface 150 or an internal program.

Meanwhile, the signal processor 170 can control the display 180 to display an image. At this time, the image displayed on the display 180 can be a still image or a moving image, and can be a 2D image or a 3D image.

Meanwhile, the signal processor 170 can display a certain object in an image displayed on the display 180. For example, the object can be at least one of a connected web screen (newspaper, magazine, etc.), an electronic program guide (EPG), various menus, a widget, an icon, a still image, a moving image, and a text.

Meanwhile, the signal processor 170 can recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 can be configured as a touch screen and used as an input device in addition to an output device.

The audio output device 185 receives a signal processed by the signal processor 170 and outputs it as an audio.

The photographing device (not shown) photographs a user. The photographing device (not shown) can be implemented by a single camera, but the present disclosure is not limited thereto and can be implemented by a plurality of cameras. Image information photographed by the photographing device (not shown) can be input to the signal processor 170.

The signal processor 170 can sense a gesture of the user based on each of the images photographed by the photographing device (not shown), the signals detected from the sensor device (not shown), or a combination thereof.

The power supply 190 supplies corresponding voltage to the image display apparatus 100.

Particularly, the voltage can be supplied to a signal processor 170 which can be implemented in the form of a system on chip (SOC), a display 180 for displaying an image, and an audio output device 185 configured to output an audio.

Specifically, the power supply 190 can include a converter for converting a converter for converting the level of an input voltage.

For example, the power supply 190 can include an ac/dc converter and a dc/dc converter when the input voltage is an alternating current voltage.

As another example, the power supply 190 can include a dc/dc converter when the input voltage is a direct current voltage.

The remote controller 200 transmits the user input to the user input interface 150. To this end, the remote controller 200 can use Bluetooth, a radio frequency (RF) communication, an infrared (IR) communication, an Ultra Wideband (UWB), ZigBee, or the like. In addition, the remote controller 200 can receive the image, audio, or data signal output from the user input interface 150, and display it on the remote controller 200 or output it as an audio.

Meanwhile, the image display apparatus 100 can be a fixed or mobile digital broadcast receiver capable of configured to receive digital broadcast.

Meanwhile, a block diagram of the image display apparatus 100 shown in FIG. 2 is a block diagram for an embodiment of the present disclosure. Each component of the block diagram can be integrated, added, or omitted according to a specification of the image display apparatus 100 actually implemented. That is, two or more components can be combined into a single component as needed, or a single component can be divided into two or more components. The function performed in each block is described for the purpose of illustrating embodiments of the present disclosure, and specific operation and apparatus do not limit the scope of the present disclosure.

Figure 3:
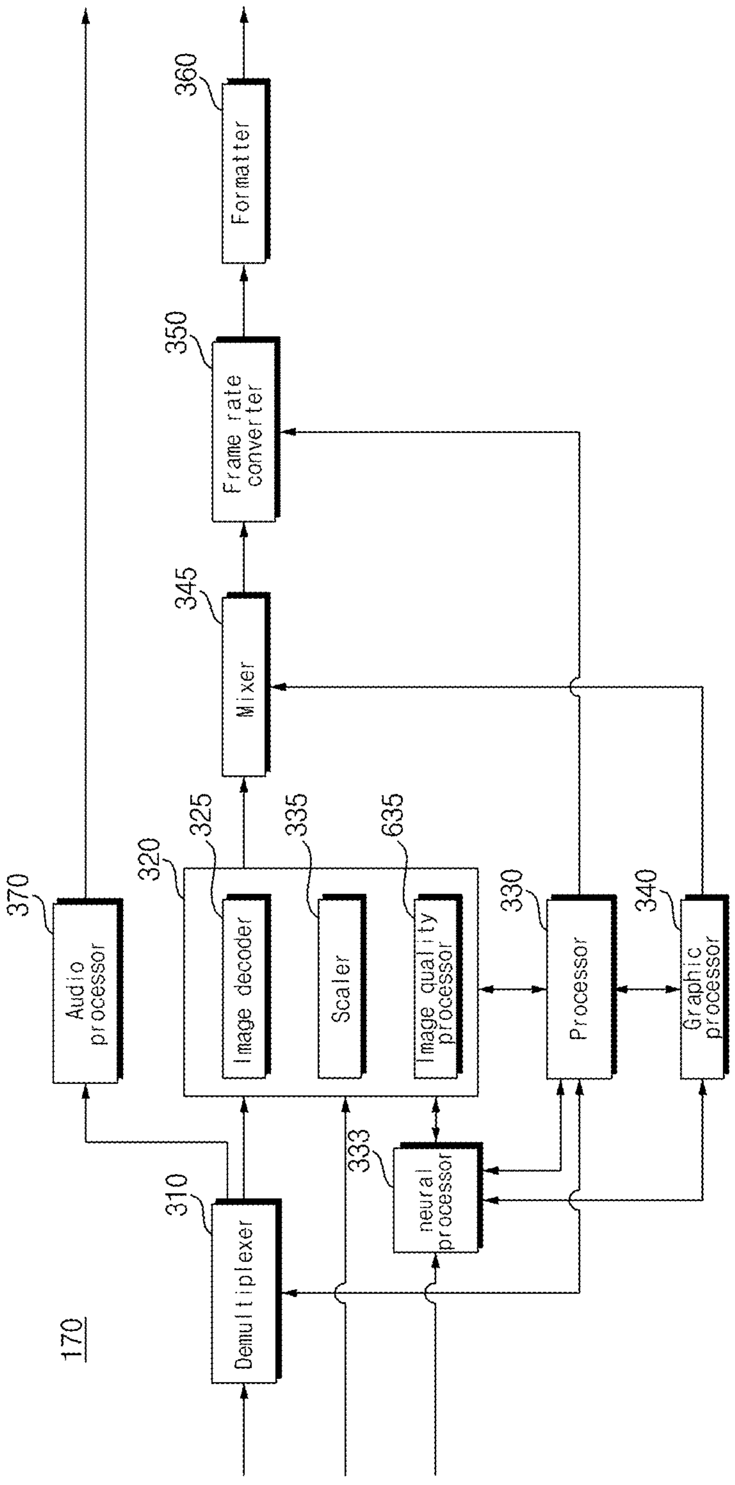
FIG. 3 is an example of an internal block diagram of a signal processor of FIG. 2.

FIG. 3 is an example of an internal block diagram of the signal processor in FIG. 2.

Referring to the figure, the signal processor 170 according to an embodiment of the present disclosure can include a demultiplexer 310, an image processor 320, a processor 330, and an audio processor 370. In addition, the signal processor 170 can further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 can be a stream signal output from the tuner 110, the demodulator 120, or the external apparatus interface 130.

The image processor 320 can perform signal processing on an input image. For example, the image processor 320 can perform image processing on an image signal demultiplexed by the demultiplexer 310.

To this end, the image processor 320 can include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image can be provided.

The scaler 335 can scale an input image signal decoded by the image decoder 325 or the like.

For example, if the size or resolution of an input image signal is small, the scaler 335 can upscale the input image signal, and, if the size or resolution of the input image signal is great, the scaler 335 can downscale the input image signal.

The image quality processor 635 can perform image quality processing on an input image signal decoded by the image decoder 325 or the like.

For example, the image quality processor 625 can perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 can generate a signal for displaying various information as a graphic or a text on the screen of the display 180. The generated OSD signal can include various data such as a user interface screen of the image display apparatus 100, various menu screens, a widget, and an icon. In addition, the generated OSD signal can include a 2D object or a 3D object.

In addition, the OSD processor 340 can generate a pointer that can be displayed on the display, based on a pointing signal input from the remote controller 200. In particular, such a pointer can be generated by a pointing signal processor, and the OSD processor 340 can include such a pointing signal processor (not shown). Obviously, the pointing signal processor (not shown) can be provided separately from the OSD processor 340.

The frame rate converter (FRC) 350 can convert a frame rate of an input image. Meanwhile, the frame rate converter 350 can be configured to output the input image without converting the frame rate.

Meanwhile, the formatter 360 can be configured to change a format of an input image signal into a format suitable for displaying the image signal on a display and output the image signal in the changed format.

In particular, the formatter 360 can be configured to change a format of an image signal to correspond to a display panel.

Meanwhile the formatter 360 can also change the format of the image signal.

The processor 330 can control overall operations of the image display apparatus 100 or the signal processor 170.

For example, the processor 330 can control the tuner 110 to control the tuning of an RF broadcast corresponding to a channel selected by a user or a previously stored channel.

In addition, the processor 330 can control the image display apparatus 100 according to a user command input through the user input interface 150 or an internal program.

In addition, the processor 330 can be configured to transmit data to the network interface 135 or to the external apparatus interface 130.

In addition, the processor 330 can control the demultiplexer 310, the image processor 320, and the like in the signal processor 170.

Meanwhile, the audio processor 370 in the signal processor 170 can perform the audio processing of the demultiplexed audio signal. To this end, the audio processor 370 can include various decoders.

In addition, the audio processor 370 in the signal processor 170 can process a base, a treble, a volume control, and the like.

The data processor (not shown) in the signal processor 170 can perform data processing of the demultiplexed data signal. For example, when the demultiplexed data signal is a coded data signal, it can be decoded. The encoded data signal can be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram can be integrated, added, or omitted according to a specification of the signal processor 170 actually implemented.

In particular, the frame rate converter 350 and the formatter 360 can be provided separately in addition to the image processor 320.

Meanwhile, the signal processing device 170 according to an embodiment of the present disclosure can further include a neural network processor 333 for learning processing.

Figure 4A:
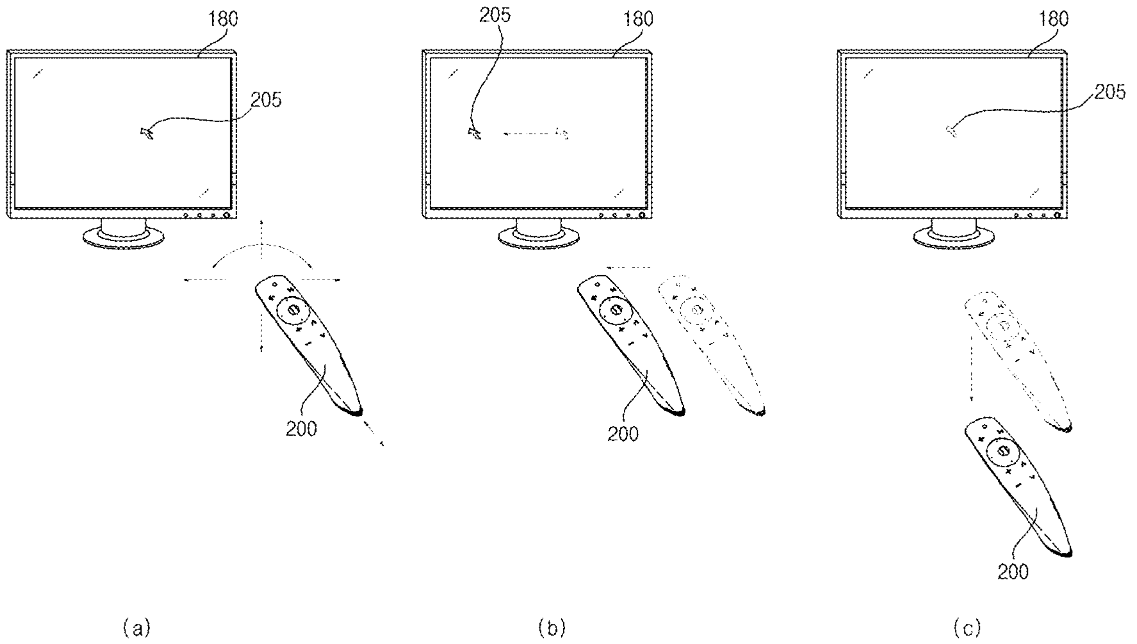
FIG. 4A is a diagram showing a method of controlling a remote controller of FIG. 2.

FIG. 4A is a diagram illustrating a control method of a remote controller of FIG. 2.

As shown in FIG. 4A (a), it is illustrated that a pointer 205 corresponding to the remote controller 200 is displayed on the display 180.

The user can move or rotate the remote controller 200 up and down, left and right (FIG. 4A (b)), and back and forth (FIG. 4A (c)). The pointer 205 displayed on the display 180 of the image display apparatus corresponds to the motion of the remote controller 200. Such a remote controller 200 can be referred to as a space remote controller or a 3D pointing apparatus, because the pointer 205 is moved and displayed according to the movement in a 3D space, as shown in the figure.

FIG. 4A (b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus can calculate the coordinate of the pointer 205 from the information on the motion of the remote controller 200. The image display apparatus can display the pointer 205 to correspond to the calculated coordinate.

FIG. 4A (c) illustrates a case where the user moves the remote controller 200 away from the display 180 while pressing a specific button of the remote controller 200. Thus, a selection within area the display 180 corresponding to the pointer 205 can be zoomed in so that it can be displayed to be enlarged. Meanwhile, when the user moves the remote controller 200 close to the display 180, the selection 180 area within the display corresponding to the pointer 205 can be zoomed out so that it can be displayed to be reduced. Meanwhile, when the remote controller 200 moves away from the display 180, the selection area can be zoomed out, and when the remote controller 200 approaches the display 180, the selection area can be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 can correspond to the moving speed or the moving direction of the remote controller 200.

Figure 4B:
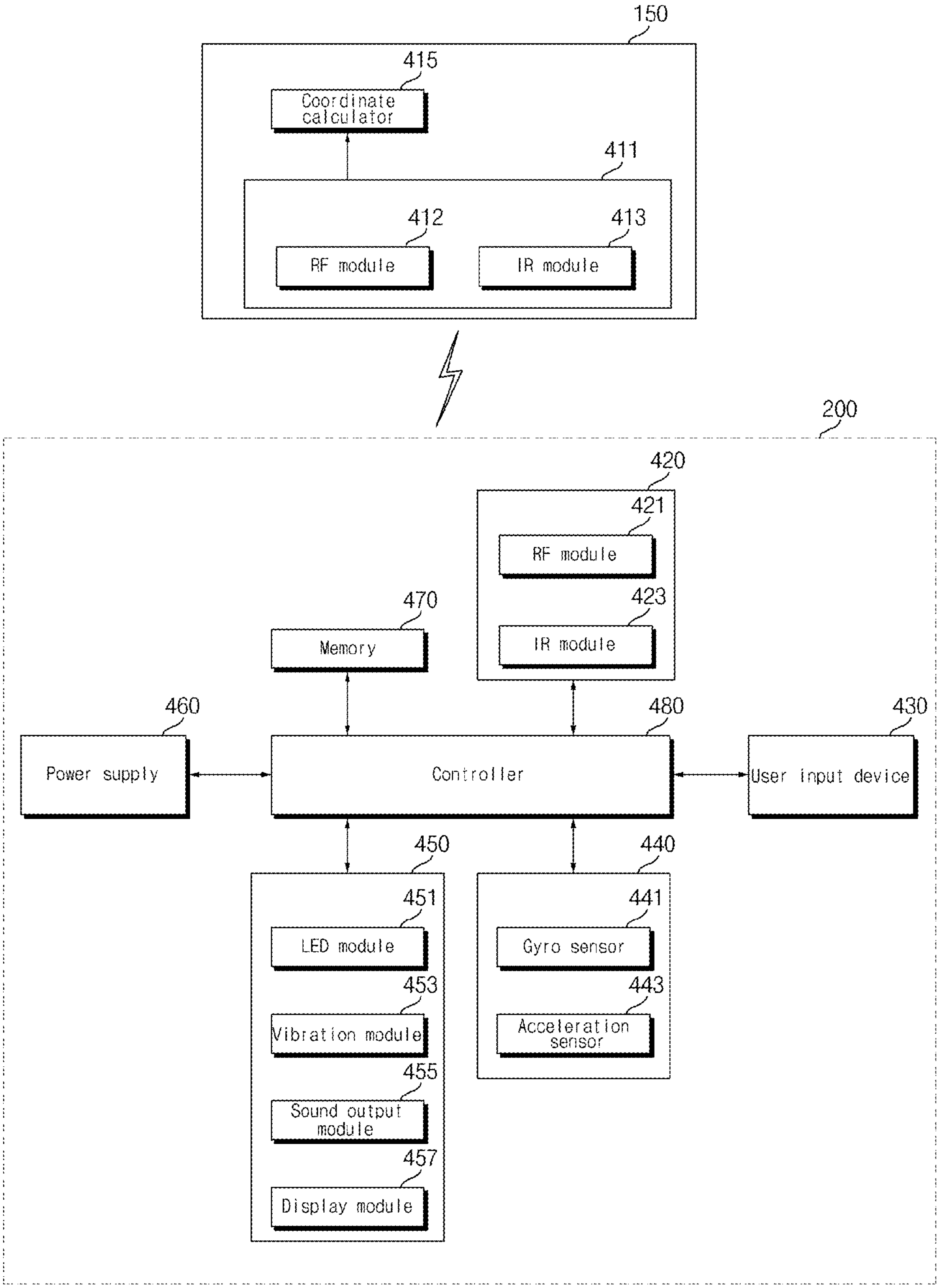
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from one of the image display apparatuses according to the embodiments of the present disclosure described above. Among the image display apparatuses according to the embodiments of the present disclosure, one image display apparatus 100 will be described as an example.

In the present embodiment, the remote controller 200 can include an RF module 421 configured to transmit and receive signals to and from the image display apparatus to RF communication standard. In 100 according a addition, the remote controller 200 can include an IR module 423 configured to transmit and receive signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 can receive the signal transmitted by the image display apparatus 100 through the RF module 421. In addition, if necessary, the remote controller 200 can be configured to transmit a command related to power on/off, channel change, volume change, and the like to the image display apparatus 100 through the IR module 423.

The user input device 435 can be implemented by a keypad, a button, a touch pad, a touch screen, or the like. The user can operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user can touch a soft key of the touch screen to input the command related to the image display apparatus 100 to the remote controller 200. In addition, the user input device 435 can include various types of input means such as a scroll key, a jog key, etc., which can be operated by the user, and the present disclosure does not limit the scope of the present disclosure.

The sensor device 440 can include a gyro sensor 441 or an acceleration sensor 443. The gyro sensor 441 can sense information regarding the motion of the remote controller 200.

For example, the gyro sensor 441 can sense information on the operation of the remote controller 200 based on the x, y, and z axes. The acceleration sensor 443 can sense information on the moving speed of the remote controller 200. Meanwhile, a distance measuring sensor can be further provided, and thus, the distance to the display 180 can be sensed.

The output device 450 can be configured to output an image or an audio signal corresponding to the operation of the user input device 435 or a signal transmitted from the image display apparatus 100. Through the output device 450, the user can recognize whether the user input device 435 is operated or whether the image display apparatus 100 is controlled.

For example, the output device 450 can include an LED module 451 that is turned on when the user input device 435 is operated or a signal is transmitted/received apparatus 100 through the to/from the image display wireless transceiver 425, a vibration module 453 configured to generate a vibration, an audio output module 455 configured to output an audio, or a display module 457 configured to output an image.

The power supply 460 supplies power to the remote controller 200. When the remote controller 200 is not moved for a certain time, the power supply 460 can stop the supply of power to reduce a power waste. The power supply 460 can resume power supply when a certain key provided in the remote controller 200 is operated.

The memory 470 can store various types of programs, application data, and the like necessary for the control or operation of the remote controller 200. If the remote controller 200 wirelessly transmits and receives a signal to/from the image display apparatus through the RF module 421, the remote controller 200 and the image display apparatus 100 transmit and receive a signal through a certain frequency band. The controller 480 of the remote controller 200 can store information regarding a frequency band or the like for wirelessly transmitting and configured to receive a signal to/from the image display apparatus 100 paired with the remote controller 200 in the memory 470 and can refer to the stored information.

The controller 480 controls various matters related to the control of the remote controller 200. The controller 480 can be configured to transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 can wirelessly transmit and receive a signal to and from the remote controller 200 through the RF module 412. In addition, the user input interface 150 can receive a signal transmitted by the remote controller 200 through the IR module 413 according to a IR communication standard.

The coordinate value calculator 415 can correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 can be configured to determine the information on the operation of the remote controller 200 and the key operation from the signal transmitted from the remote controller 200, and, correspondingly, control the image display apparatus 100.

For another example, the remote controller 200 can calculate the pointer coordinate value corresponding to the operation and output it to the user input interface 150 of the image display apparatus 100. In this case, the user input interface 150 of the image display apparatus 100 can be configured to transmit: information on the received pointer coordinate value to the controller 180 without a separate correction process of hand shake or error.

Figure 5:
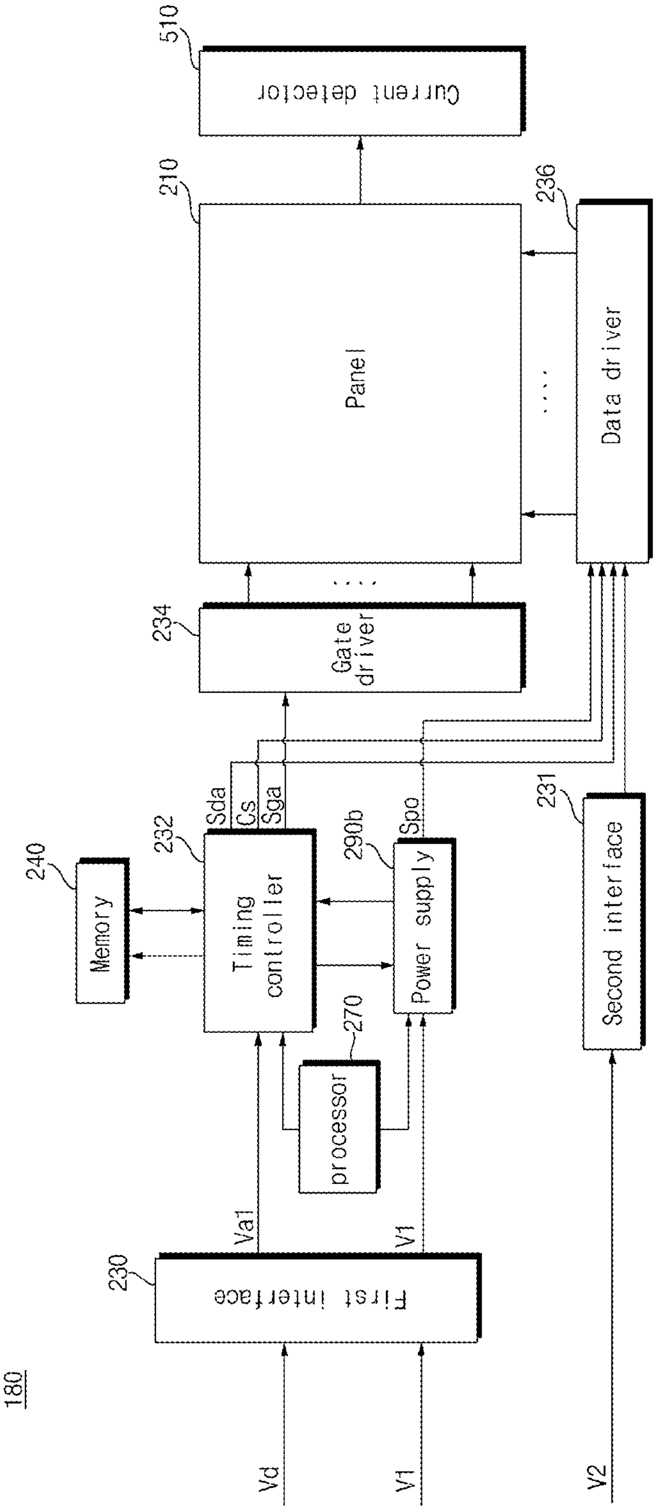
FIG. 5 is an internal block diagram of a display of FIG. 2.

For another example, unlike the figure, the coordinate value calculator 415 can be provided in the signal processor 170, not in the user input interface 150. FIG. 5 is an internal block diagram of a display of FIG. 2.

Referring to FIG. 5, the organic light emitting diode panel-based display 180 can include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC voltage V1, and a second DC voltage V2, and can display a certain image based on the image signal Vd.

Meanwhile, the first interface 230 in the display 180 can receive the image signal Vd and the first DC voltage V1 from the signal processor 170.

Here, the first DC voltage V1 can be used for the operation of the power supply 290 and the timing controller 232 in the display 180.

Next, the second interface 231 can receive a second DC voltage V2 from an external power supply 190. Meanwhile, the second DC voltage V2 can be input to the data driver 236 in the display 180.

The timing controller 232 can be configured to output a data driving signal Sda and a gate driving signal Sga, based on the image signal Vd.

For example, when the first interface 230 converts the input image signal Vd and outputs the converted image signal val, the timing controller 232 can be configured to output the data driving signal Sda and the gate driving signal Sga based on the converted image signal val.

The timing controller 232 can further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda can be a data driving signal for driving of RGBW subpixel.

Meanwhile, the timing controller 232 can further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 can include an organic light emitting layer. In order to display an image, a plurality of gate lines GL and data lines DL can be disposed in a matrix form in each pixel corresponding to the organic light emitting layer.

Meanwhile, the data driver 236 can be configured to output a data signal to the organic light emitting diode panel 210 based on a second DC voltage V2 from the second interface 231.

The power supply 290 can supply various power supplies to the gate driver 234, the data driver 236, the timing controller 232, and the like.

The current detector 510 can detect the current flowing in a sub-pixel of the organic light emitting diode panel 210. The detected current can be input to the processor 270 or the like, for a cumulative current calculation.

The processor 270 can perform each type of control of the display 180. For example, the processor 270 can control the gate driver 234, the data driver 236, the timing controller 232, and the like.

Meanwhile, the processor 270 can receive current information flowing in a sub-pixel of the organic light emitting diode panel 210 from the current detector 510.

Figure 6A:
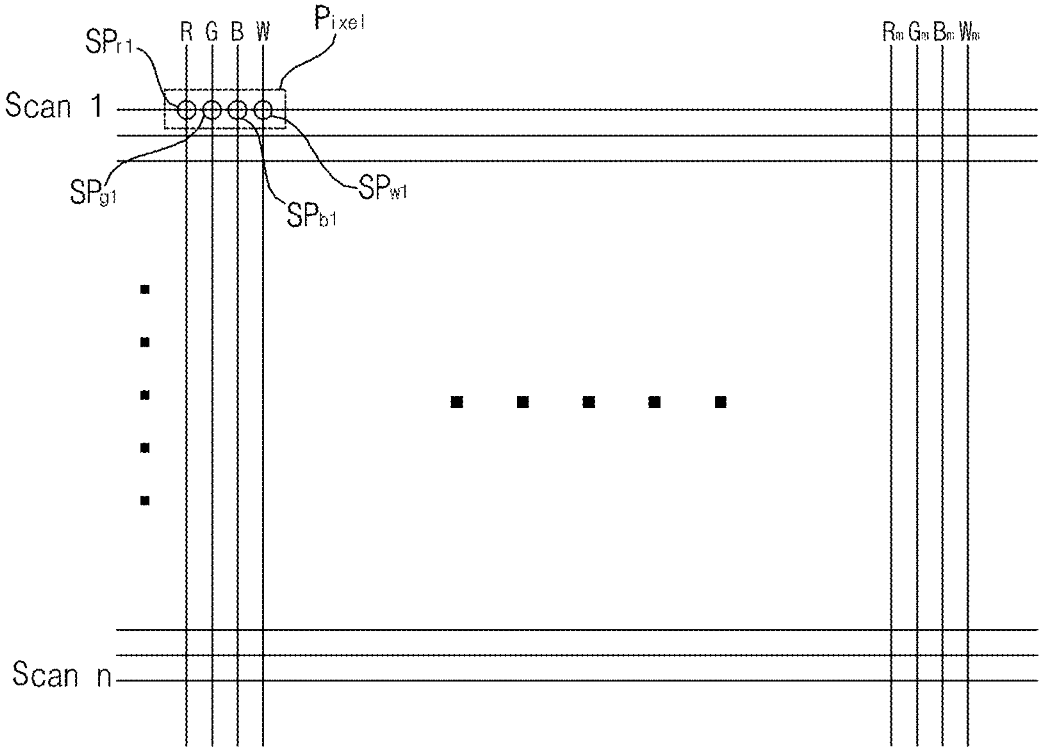
FIGS. 6A and 6B are diagrams referred to in the description of an organic light emitting diode panel of FIG. 5.
Figure 6B:
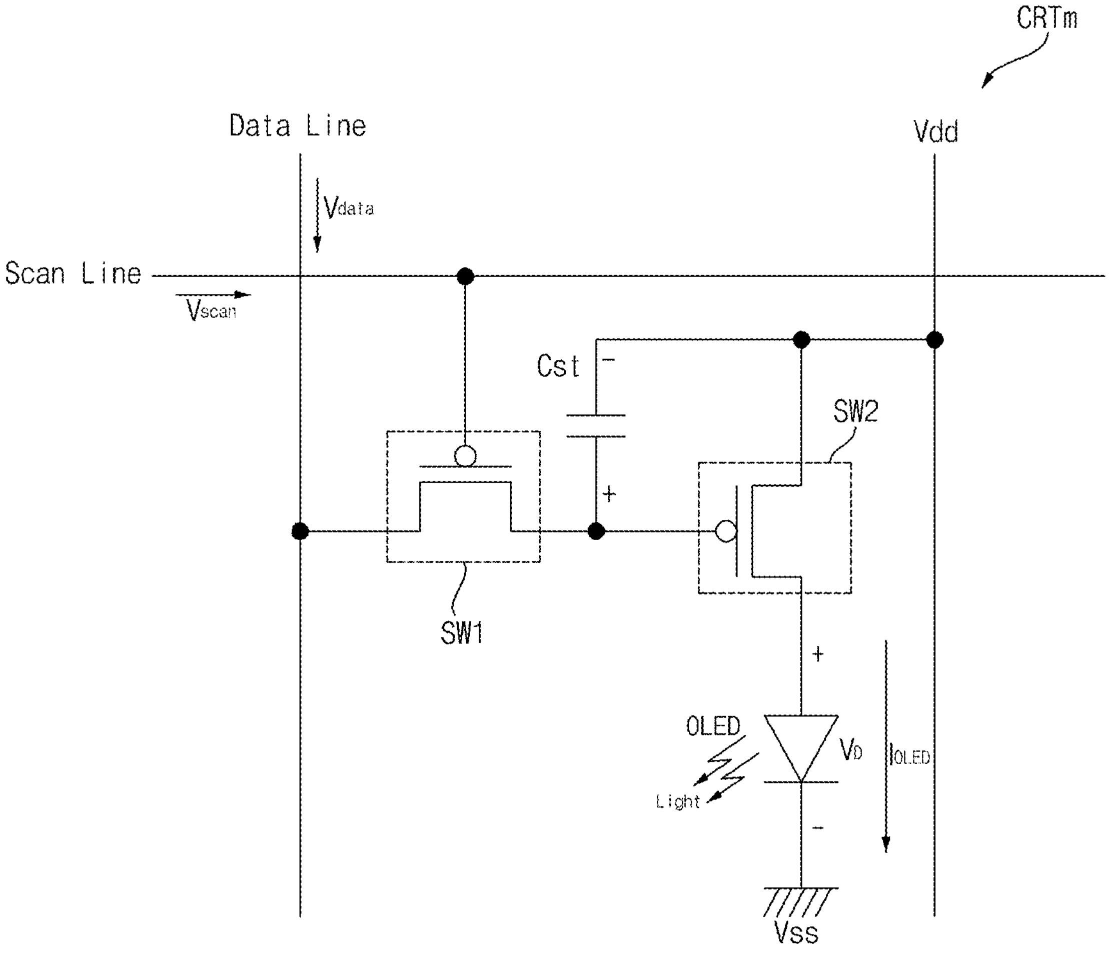

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to the figure, the organic light emitting diode panel 210 can include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the figure, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to the figure, an organic light emitting sub pixel circuit (CRTm) can include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (Vdd) level transmitted to the other terminal of the storage capacitor Cst.

For example, when the data signal has a different level according to a Plume Amplitude Modulation (PAM) method, the power level stored in the storage capacitor Cst is changed according to the level difference of the data signal Vdata.

For another example, when the data signal has a different pulse width according to a Pulse Width Modulation (PWM) method, the power level stored in the storage capacitor Cst is changed according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED can include a light emitting layer (EML) of RGBW corresponding to a sub-pixel, and can include at least one of a hole injecting layer (HIL), a hole transporting layer (HTL), an electron transporting layer (ETL), and an electron injecting layer (EIL). In addition, it can include a hole blocking layer, and the like.

Meanwhile, the subpixels emit a white light in the organic light emitting layer OLED. However, in response to green, red, and blue subpixels, a subpixel is provided with a separate color filter for color implementation. That is, in response to green, red, and blue subpixels, each of the subpixels further includes green, red, and blue color filters. Meanwhile, since a white subpixel output a white light, a separate color filter is not required.

Meanwhile, in the figure, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel can be continuously emitted from an organic light emitting diode (OLED) after a scan signal is applied during a unit display period, specifically, during a unit frame.

Figure 7:
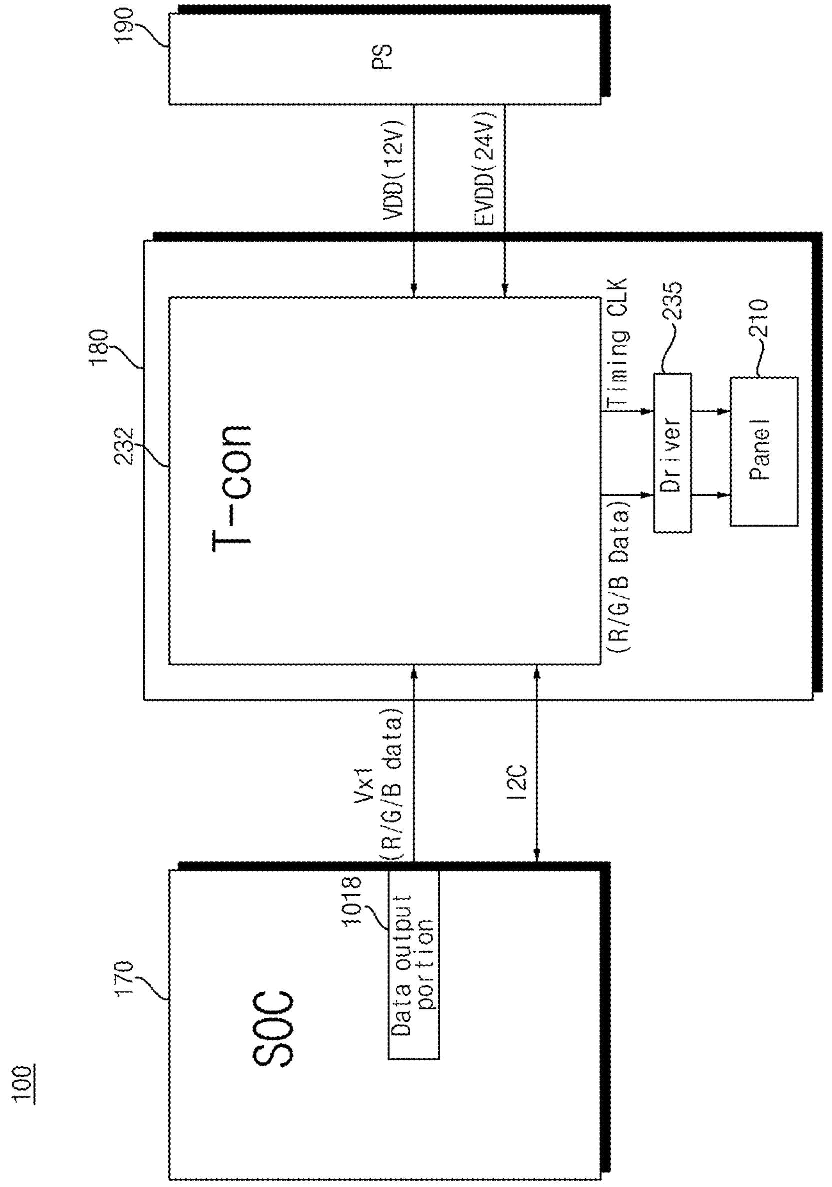
FIG. 7 shows an example of an internal block diagram of an image display apparatus according to an embodiment of the present disclosure.

FIG. 7 is an example of an internal block diagram of a power supply according to an embodiment of the present disclosure.

Referring to the figure, the image display apparatus 100 according to an embodiment of the present disclosure includes a panel 210, a signal processing device 170 signal-processing an input image and output an image signal, and a timing controller 232 driving the panel 210 based on the image signal from the signal processing device 170.

The signal processing device 170 can be configured to transmit, to the timing controller 232, R, G, and B data based image signals based on a predetermined transmission data format.

To this end, the signal processing device 170 can include a data output portion 1018 that output the R, G, and B data based image signals based on the predetermined transmission data format.

At this time, the transmission data format can be a Vx1 format as illustrated in the figure, but is not limited thereto, and can be variously modified.

Meanwhile, the timing controller 232 can be configured to output the R, G, and B data based image signals, and a timing clock (CLK) signal based on the signal received from the signal processing device 170.

Meanwhile, the timing controller 232 can be configured to transmit, to the signal processing device 170, current information output from the timing controller 232 or current information which flows on the panel 210 through I2C communication.

Meanwhile, the panel 210 and the timing controller 232 can be provided in the display 180.

Meanwhile, the image display apparatus 100 according to an embodiment of the present disclosure includes a power supply 190 supplying display driving voltage EVDD to the display 180.

For example, the power supply 190 can include an ac/dc converter (not shown) configured to convert input ac voltage into dc voltage, and a dc/dc converter (not illustrated) configured to convert a level of the dc voltage from the ac/dc converter, and output the display driving voltage EVDD.

Meanwhile, when the display 180 is an organic light emitting panel, the display driving voltage EVDD can be pixel driving voltage of an organic light emitting pixel.

Meanwhile, the power supply 190 can further include a second dc/dc converter (not shown) configured to convert the level of the dc voltage from the ac/dc converter, and output gate driving voltage VDD.

At this time, the gate driving voltage VDD can be lower than the display driving voltage EVDD, and can be input into the timing controller 232 or a driving driver 235.

For example, a voltage level of the display driving voltage EVDD can be approximately 24 V, and the gate driving voltage VDD can be approximately 12 V.

Meanwhile, the display 180 can further include the driving driver 235 that drives the panel 210 based on the R, G, and B data based image signals and the timing clock (CLK) signal from the timing controller 232.

The driving driver 235 can include the gate driver 234 and the data driver 236 of FIG. 5.

Meanwhile, the signal processing device 170 according to an embodiment of the present disclosure can be configured to output the data enable signal DE when transmitting the R, G, and B data based image signals.

The data enable signal DE can be divided into the active period HA and the blank period HB, and the signal processing device 170 can be configured to output, to the timing controller 232, an image signal including R, G, and B data in the image signal in response to a length of the active period HA.

Meanwhile, when transmitting the R, G, and B data based image signals, raising data bits of the R, G, and B data is required due to a frequency increase of a vertical synchronization signal Vsync or an increase in peak luminance.

Therefore, the present disclosure proposes a method which enables the data bit to be raised without extending a transmission lane between the signal processing device 170 and the timing controller 232 to enhance a grayscale expression power when displaying an image.

To this end, the signal processing device 170 is configured to output the data enable signal DE divided into the active period HA and the blank period HB, and when the data bit of the image signal is changed, the length of the active period HA or the length of the blank period HB is changed. Accordingly, the grayscale expression power when displaying the image can be enhanced. In particular, the grayscale expression power when displaying the image can be enhanced without changing the transmission lane of the image signal.

In particular, the signal processing device 170 according to an embodiment of the present disclosure can be configured to change the length of the active period HA or the length of the blank period HB in the data enable signal DE when raising the data bit is required.

For example, the signal processing device 170 can be configured to output a first data enable signal DE corresponding to a first active period HA and a first blank period HB in response to an image display mode being a normal mode, and output a second data enable signal DE corresponding to a second active period HA and a second blank period HB in response to the image display mode being a game mode.

At this time, a length of the second active period HA can be greater than a length of the first active period HA, and a length of the second blank period HB can be less than a length of the first blank period HB. Accordingly, the data enable signal DE is changed based on the image display mode to enhance the grayscale expression power when displaying the image.

As another example, the signal processing device 170 can be configured to output the first data enable signal DE corresponding to the first active period HA and the first blank period HB in order to display an image having a peak luminance of a first level in the panel 210, and output the second data enable signal DE corresponding to the second active period HA and the second blank period HB in order to display an image of a peak luminance of a second level higher than the first level in the panel 210.

At this time, a length of the second active period HA can be greater than a length of the first active period HA, and a length of the second blank period HB can be less than a length of the first blank period HB. Accordingly, the data enable signal DE is changed to enhance the grayscale expression power when displaying the image.

As yet another example, the signal processing device 170 can be configured to output the first data enable signal DE corresponding to the first active period HA and the first blank period HB when a peak luminance level of the R, G, and B data to be output to the timing controller 232 is a first level, and output the second data enable signal DE corresponding to the second active period HA and the second blank period HB when the peak luminance level of the R, G, and B data to be output to the timing controller 232 is a second level higher than the first level. Accordingly, the data enable signal DE is changed to enhance the grayscale expression power when displaying the image.

Meanwhile, the signal processing device 170 can be configured to increase the length of the active period HA of the data enable signal DE or decrease the length of the blank period as frequency HB the of vertical the synchronization signal becomes higher. Accordingly, the data enable signal DE is changed based on the frequency of the vertical synchronization signal to enhance the grayscale expression power when displaying the image.

Meanwhile, the signal processing device 170 can be configured to increase the length of the active period HA of the data enable signal DE or decrease the length of the blank period HB as the data bit of the image signal increases. Accordingly, the data enable signal DE is changed to enhance the grayscale expression power when displaying the image.

Meanwhile, the signal processing device 170 can be configured to perform a data enable variation mode when raising the data bit is required, and perform a data enable fixation mode when raising the data bit is not required.

For example, the signal processing device 170 can be configured to change the length of the active period HA or the length of the blank period HB in response to the data enable variation mode. Accordingly, the data enable signal DE is changed according to the data enable variation mode to enhance the grayscale expression power when displaying the image.

Meanwhile, the signal processing device 170 can be configured to increase the data bit of the R, G, and B data as the length of the active period HA of the data enable signal DE increases. Accordingly, the grayscale expression power when displaying the image can be enhanced.

Meanwhile, the signal processing device 170 can be configured to fix the length of the active period HA or the length of the blank period HB in response to the data enable fixation mode. Accordingly, the signal processing device 170 can operate in the data enable fixation mode.

Figure 8:
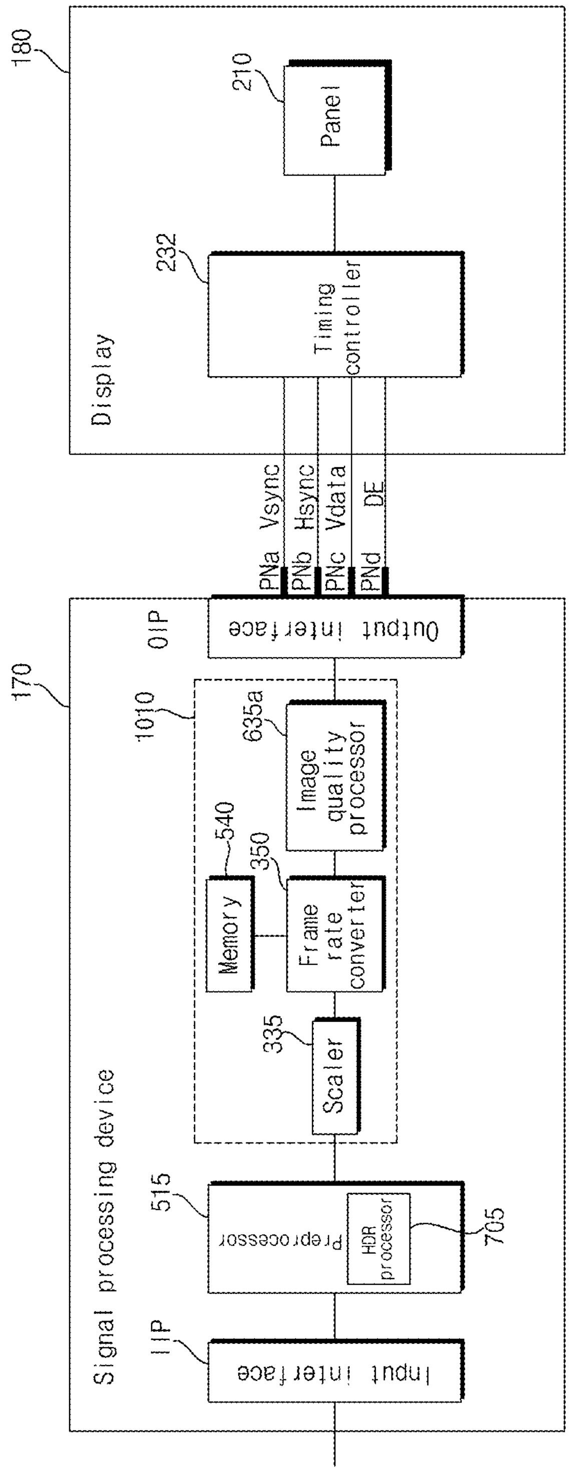
FIG. 8 is an example of an internal block diagram of a signal processing device according to an embodiment of the present disclosure.

FIG. 8 is an example of an internal block diagram of a signal processing device according to an embodiment of the present disclosure.

Referring to the figure, the signal processing device 170 according to an embodiment of the present disclosure can include an input interface IIP configured to receive an image signal from the outside, an image processor 1010 configured to generate image frame data ImgL based on the image signal, and an output interface OIP configured to output R, G, and B data based image frame data ImgL.

Accordingly, the timing controller 232 can output R, G, and B data and clock signals for driving the panel 210 based on the received R, G, and B data based image frame data ImgL.

Meanwhile, the output interface OIP of FIG. 8 can correspond to the data output portion 1018 of FIG. 7.

Meanwhile, the input interface IIP can receive image signals from the computer PC, the mobile terminal 600, the set-top box STB, the game console GSB, and the server SVR in FIG. 1.

Meanwhile, the signal processing device 170 according to an embodiment of the present disclosure can further include a preprocessor 515 which performs signal processing such as noise reduction, noise removal and HDR signal processing on an image signal from the input interface IIP.

The preprocessor 515 performs signal processing on the image signal from the input interface IIP.

For example, when the received image signal is a decoded image signal, the preprocessor 515 can perform signal processing such as noise removal without additional decoding processing.

As another example, when the received image signal is an image signal encoded according to video compression standards, the preprocessor 515 can perform decoding according to the video compression standards after signal processing such as noise removal.

Meanwhile, when the received image signal is an HDR image signal, the preprocessor 515 can perform HDR signal processing. To this end, the preprocessor 515 can include an HDR processor 705.

The HDR processor 705 can receive an image signal and perform high dynamic range (HDR) processing on the input image signal.

For example, the HDR processor 705 can convert a standard dynamic range (SDR) image signal into an HDR image signal.

As another example, the HDR processor 705 can receive an image signal and perform grayscale processing on the input image signal for high dynamic range.

The HDR processor 705 can bypass grayscale conversion when the input image signal is an SDR image signal and can perform grayscale conversion when the input image signal is an HDR image signal.

The signal processing device 170 according to an embodiment of the present disclosure can further include the memory 540 in which frame data for image processing of the image processor 1010 is stored. Alternatively, the memory 540 can be included in the image processor 1010, as shown in the figure.

That is, the image processor 1010 in the signal processing device 170 according to an embodiment of the present disclosure can include the memory 540 for storing frame data for image processing.

The image processor 1010 can generate the image frame data ImgL and output the same based on an image signal processed in the preprocessor 515.

To this end, the image processor 1010 can include a scaler 335 which performs scaling so that the resolution of an image signal is consistent with the resolution of the panel, a frame rate converter 350 which operates to change a frame rate, and an image quality processor **635*a*** which performs image quality processing.

The image processor 1010 can further include the memory 540 for storing frame data for frame rate change in the frame rate converter 350.

Meanwhile, an image quality processor **635*a*** can perform image-quality processing for the image frame data ImgL.

For example, the image quality processor **635*a*** can perform signal processing such as noise reduction, effect enhancement signal processing, luminance amplification, luminance expansion, etc.

Meanwhile, the output interface OIP can receive the image frame data ImgL from the image quality processor **635*a***.

Meanwhile, the output interface OIP can be configured to output the R, G, and B data based image frame data ImgL.

Meanwhile, the output interface OIP can include a first output terminal PNa for transmitting a vertical synchronization signal Vsync, a second output terminal PNb for transmitting a horizontal synchronization signal Hsync, a third output terminal PNc for transmitting R, G, and B data based image data signals Vdata, and a fourth output terminal PNd for transmitting the data enable signal DE.

Meanwhile, the data enable signal DE can be divided into the active period HA and the blank period HB.

The timing controller 232 can receive the image data signal Vdata output from the third output terminal PNC in response to the active period HA of the data enable signal DE.

Meanwhile, the output interface OIP in the signal processing device 170 can be configured to change the length of the active period HA or the length of the blank period HB in response to the data bit of the image signal being changed. Accordingly, the grayscale expression power when displaying the image can be enhanced. In particular, the grayscale expression power when displaying the image can be enhanced without changing the transmission lane of the image signal.

For example, the output interface OIP in the signal processing device 170 can be configured to output the first data enable signal DE corresponding to the first active period HA and the first blank period HB in response to the image display mode being a normal mode, and output the second data enable signal DE corresponding to the second active period HA and the second blank period HB in response to the image display mode being the game mode.

At this time, the length of the second active period HA can be greater than the length of the first active period HA, and the length of the second blank period HB can be less than the length of the first blank period HB. Accordingly, the data enable signal DE is changed based on the image display mode to enhance the grayscale expression power when displaying the image.

As another example, the output interface OIP in the signal processing device 170 can be configured to output the first data enable signal DE corresponding to the first active period HA and the first blank period HB in order to display the image having the peak luminance of the first level in the panel 210, and output the second data enable signal DE corresponding to the second active period HA and the second blank period HB in order to display the image of the peak luminance of the second level higher than the first level in the panel 210.

At this time, the length of the second active period HA can be greater than the length of the first active period HA, and the length of the second blank period HB can be less than the length of the first blank period HB. Accordingly, the data enable signal DE is changed to enhance the grayscale expression power when displaying the image.

As yet another example, the output interface OIP in the signal processing device 170 can be configured to output the first data enable signal DE corresponding to the first active period HA and the first blank period HB when a peak luminance level of the R, G, and B data to be output to the timing controller 232 is the first level, and output the second data enable signal DE corresponding to the second active period HA and the second blank period HB when the peak luminance level of the R, G, and B data to be output to the timing controller 232 is the second level higher than the first level. Accordingly, the data enable signal DE is changed to enhance the grayscale expression power when displaying the image.

Meanwhile, the output interface OIP in the signal processing device 170 can be configured to increase the length of the active period HA of the data enable signal DE or decrease the length of the blank period HB as the frequency of the vertical synchronization signal increases. Accordingly, the data enable signal DE is changed based on the frequency of the vertical synchronization signal to enhance the grayscale expression power when displaying the image.

Meanwhile, the output interface OIP in the signal processing device 170 can be configured to increase the length of the active period HA of the data enable signal DE or decrease the length of the blank period HB as the data bit of the image signal increases. Accordingly, the data enable signal DE is changed to enhance the grayscale expression power when displaying the image.

Meanwhile, the output interface OIP in the signal processing device 170 can be configured to perform a data enable variation mode when raising the data bit is required, and perform a data enable fixation mode when raising the data bit is not required.

For example, the output interface OIP in the signal processing device 170 can be configured to change the length of the active period HA or the length of the blank period HB in response to the data enable variation mode. Accordingly, the data enable signal DE is changed according to the data enable variation mode to enhance the grayscale expression power when displaying the image.

Meanwhile, the output interface OIP in the signal processing device 170 can be configured to increase the data bit of the R, G, and B data as the length of the active period HA of the data enable signal DE increases. Accordingly, the grayscale expression power when displaying the image can be enhanced.

Meanwhile, the output interface OIP in the signal processing device 170 can be configured to fix the length of the active period HA or the length of the blank period HB in response to the data enable fixation mode. Accordingly, the signal processing device 170 can operate in the data enable fixation mode.

Figure 9A:
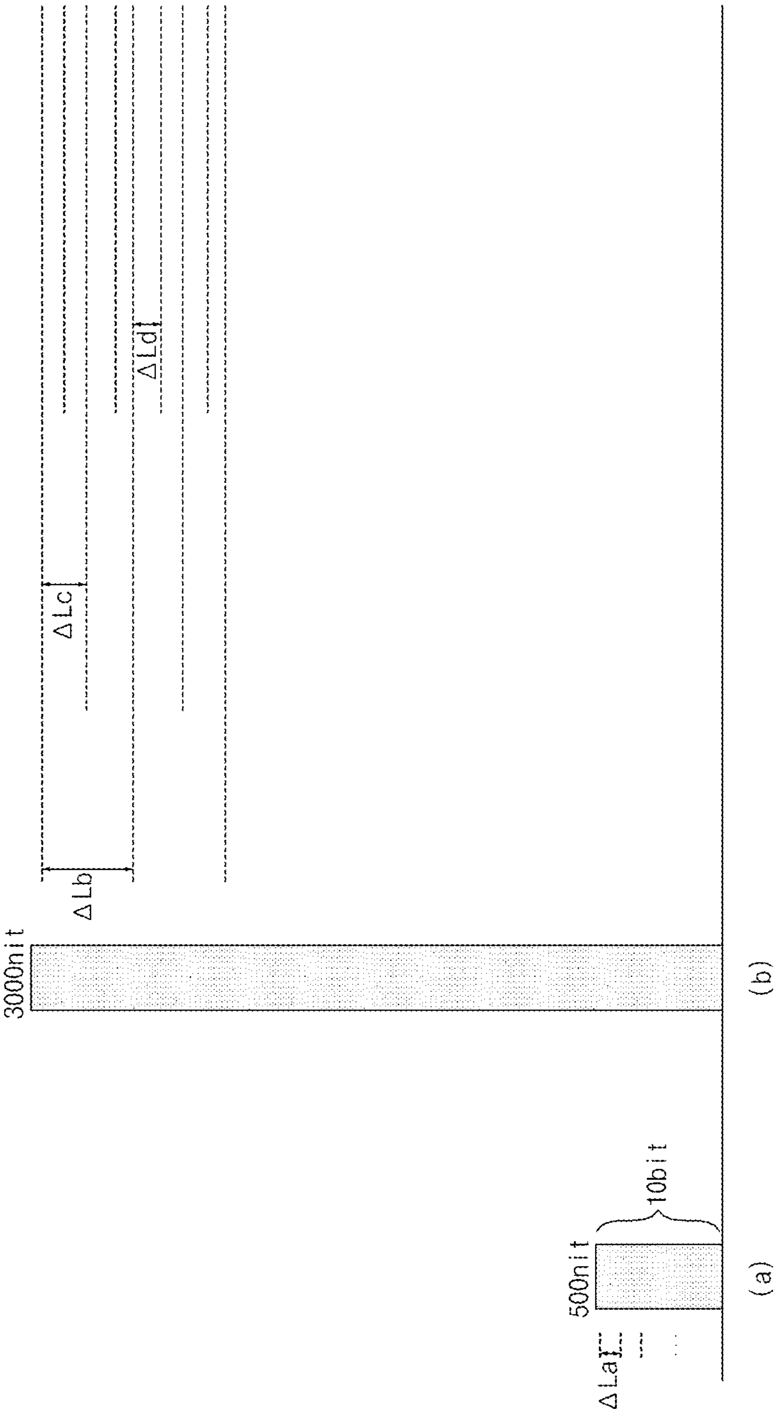
Figures 9C, 10A:
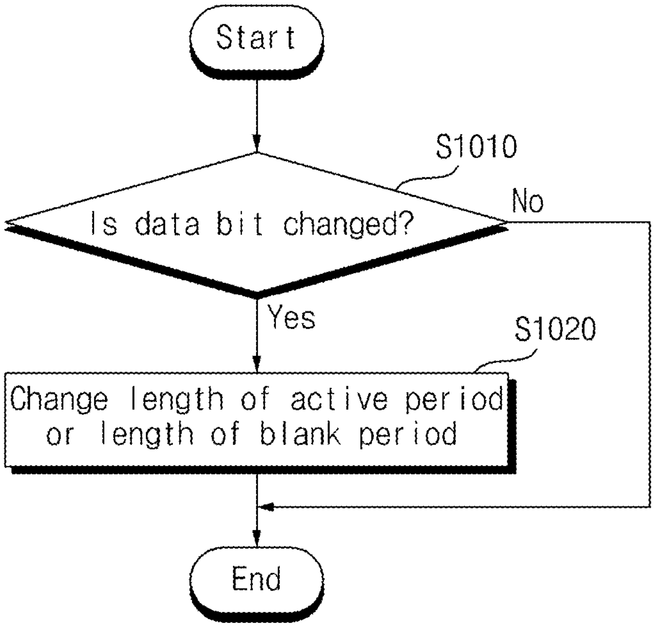

FIGS. 9A to 9C are diagrams referred to in the description of an operation of an image display apparatus related to the present disclosure.

FIG. 9A shows various peak luminances displayed in the display.

Referring to the figure, (a) of FIG. 9A shows that a displayable peak luminance of the display or a peak luminance of the image signal is 500 nit.

Meanwhile, when the displayable peak luminance of the display or the peak luminance of the image signal is 500 nit, a transmission bit of the R, G, and B data transmitted to the timing controller 232 from the signal processing device 170 can be 10 bits.

Meanwhile, when the transmission bit is 10 bits, a luminance difference ΔLa of 1 grayscale can be approximately 0.5 nit.

(b) of FIG. 9A shows that the displayable peak luminance of the display or the peak luminance of the image signal is 3000 nit.

Meanwhile, when the displayable peak luminance of the display or the peak luminance of the image signal is 3000 nit, the transmission bit of the R, G, and B data transmitted to the timing controller 232 from the signal processing device 170 can be 10 bits to 12 bits.

Meanwhile, when the transmission bit is 10 bits, a luminance difference ΔLb of 1 grayscale can be approximately 3 nit, when the transmission bit is 11 bits, a luminance difference ΔLc of 1 grayscale can be approximately 1.5 nit, and when the transmission bit is 12 bits, a luminance difference ΔLd of 1 grayscale can be approximately 0.75 nit.

According to this, as the transmission bit increases, the luminance difference of 1 grayscale decreases.

For example, when a data transmission format is a Vx1 format, the number of transmission lanes is 16, the frequency of the vertical synchronization signal is 120 Hz, and an image signal of 4 K (3840×2160) resolution is transmitted in the 5 byte mode, a maximum transmission bit can be 12 bits.

As another example, when the data transmission format is the Vx1 format, the number of transmission lanes is 16, the frequency of the vertical synchronization signal is 144 Hz higher than 120 Hz, and the image signal of 4 K (3840×2160) resolution is transmitted in the 4 byte mode, the maximum transmission bit can be 10 bits.

FIG. 9B shows the 4 byte mode and the 5 byte mode of the Vx1 format.

Referring to the figure, according to the 4 byte mode of the Vx1 format, R, G, and B data can be allocated within 8*4=32 bits.

In other words, 10-bit data can be allocated approximately for each of the R, G, and B data by 32/3.

In the figure, it is illustrated that R[2] to R[9] are arranged in Byte0, G[2] to G[9] are arranged in Byte1, B[2] to B[9] are arranged in Byte2, and R[0], R[1], G[0], G[1], B[0], and B[1] are arranged in Byte3.

In other words, in the figure, 10-bit R, G, and B data are illustrated by R[0] to R[9], G[0] to G[9], and B[0] to B[9] according to the 4 byte mode.

Meanwhile, according to the 5 byte mode of the Vx1 format, the R, G, and B data can be allocated within 8*5=40 bits.

In other words, 13-bit data can be allocated approximately for each of the R, G, and B data by 40/3.

In the figure, it is illustrated that R[3] to R[11] are arranged in Byte0, G[4] to G[11] are arranged in Byte1, B[4] to B[11] are arranged in Byte2, R[2], R[3], G[2], G[3], B[2], and B[3] are arranged in Byte3, and R[0], R[1], G[0], G[1], B[0], and B[1] are arranged in Byte4.

In other words, in the figure, 12-bit R, G, and B data are illustrated by R[0] to R[11], G[0] to G[11], and B[0] to B[11] according to the 5 byte mode.

Meanwhile, by using bits not allocated within some bytes in the figure, up to R[12], G[12], and B[12] are enabled to be expressed, and Accordingly, it is possible to transmit a maximum of 13 bits of R, G, and B data in the 5 byte mode.

However, when the frequency of the vertical synchronization signal is 120 Hz, it is possible to transmit a maximum of 13 bits of R, G, and B data in the 5 byte mode, and when the frequency of the vertical synchronization signal is 144 Hz, transmission of maximum of 13 bits of R, G, and B data in the 5 byte mode can not be applied. This is described with reference to FIG. 9C.

FIG. 9C shows the 4 byte mode and the 5 byte mode when the frequency of the vertical synchronization signal is 120 Hz and 144 Hz.

In the figure, the data transmission bit in the 4 byte mode can correspond to 10 bits, and the data transmission bit in the 5 byte mode can correspond to 12 bits.

Referring to the figure, when the frequency of the vertical synchronization signal is 120 Hz, and in response to 4 byte mode, a pixel clock is 74.25 MHZ, and an operating frequency of Vx1 is 2.97 GHZ, an active period, a blank period, and a total period of Horizontal can be 240, 35, and 275 clocks, respectively, and an active period, a blank period, and a total period of Vertical can be 2160, 90, and 2250 clocks, respectively.

Next, when the frequency of the vertical synchronization signal is 120 Hz, and in response to 5 byte mode, the pixel clock can be 74.25 MHZ, and the operating frequency of Vx1 is 3.712 GHz higher than 2.97 GHz, the active period, the blank period, and the total period of Horizontal can be 240, 35, and 275 clocks, respectively, and the active period, the blank period, and the total period of Vertical can be 2160, 90, and 2250 clocks, respectively.

Next, Referring to the figure, when the frequency of the vertical synchronization signal is 144 Hz, and in response to 4 byte mode, the pixel clock can be 89.1 MHZ, and the operating frequency of Vx1 is 3.564 GHz, the active period, the blank period, and the total period of Horizontal can be 240, 35, and 275 clocks, respectively, and the active period, the blank period, and the total period of Vertical can be 2160, 90, and 2250 clocks, respectively.

Next, when the frequency of the vertical synchronization signal is 144 Hz, and in response to 5 byte mode, the pixel clock can be 89.1 MHZ, and the operating frequency of Vx1 is 4.455 GHz higher than 3.564 GHz, the active period, the blank period, and the total period of Horizontal can be 240, 35, and 275 clocks, respectively, and the active period, the blank period, and the total period of Vertical can be 2160, 90, and 2250 clocks, respectively.

Meanwhile, in the transmission format of Vx1, an upper limit of the operating frequency can be 4 GHZ according to a standard. Accordingly, when the frequency of the vertical synchronization signal is 144 Hz, the 4 byte mode can be possible, but the 5 byte mode can be impossible.

Accordingly, when the frequency of the vertical synchronization signal is 144 Hz, only the 4 byte mode can be possible, not the 5 byte mode.

In other words, when the frequency of the vertical synchronization signal is 144 Hz, only 10 bits can be possible, not 12 bits.

In this case, there is a problem in that the grayscale expression power is deteriorated as the peak luminance of the display increases and peak luminance of the image signal increases.

Accordingly, the present disclosure proposes a method for enhancing the grayscale expression power when displaying the image without changing the transmission lane of the image signal. This is described with reference to FIG. 10A or below.

FIG. 10A is a flowchart showing an example of an operating method of an image display apparatus according to an embodiment of the present disclosure.

Referring to the figure, the signal processing device 170 according to an embodiment of the present disclosure is configured to determine which changing the data bit is required when transmitting the image signal including the R, G, and B data to the timing controller 232 (S1010), and change the length of the active period HA or the length of the blank period HB of the data enable signal DE when the changing the data bit is required (S1020).

Meanwhile, the signal processing device 170 can be configured to determine which changing the data bit is required when the peak luminance of the image signal is changed, which is equal to or more than a reference peak luminance (e.g., xxxx nit).

Meanwhile, the signal processing device 170 can be configured to determine which changing the data bit is required when the frequency of the vertical synchronization signal of the image signal is changed and increased.

Specifically, when the frequency of the vertical synchronization signal of the image signal is changed from 60 Hz to 120 Hz, or changed from 120 Hz to 144 Hz, the signal processing device 170 can be configured to determine which changing the data bit is required.

Meanwhile, the signal processing device 170 can be configured to determine which changing the data bit is required in response to the image display mode being changed from the normal mode to the game mode.

Meanwhile, while changing the data bit is required, the signal processing device 170 is configured to enter the data enable variation mode to change the length of the active period HA or the length of the blank period HB in the data enable signal DE. Accordingly, the data enable signal DE is changed according to the data enable variation mode to enhance the grayscale expression power when displaying the image.

Meanwhile, when the signal processing device 170 is configured to determine that changing the data bit is not required in step S1010, the signal processing device 170 is configured to enter the data enable fixation mode to fix the length of the active period HA or the length of the blank period HB. Accordingly, the signal processing device 170 can operate in the data enable fixation mode.

For example, when the signal processing device 170 determines that changing the data bit is not required, the signal processing device 170 is configured to enter the data enable fixation mode to control the 4 byte mode or the 5 byte mode of 120 Hx to be performed or the 4 byte mode of 144 Hx to be performed as in FIG. 9C.

Figure 10B:
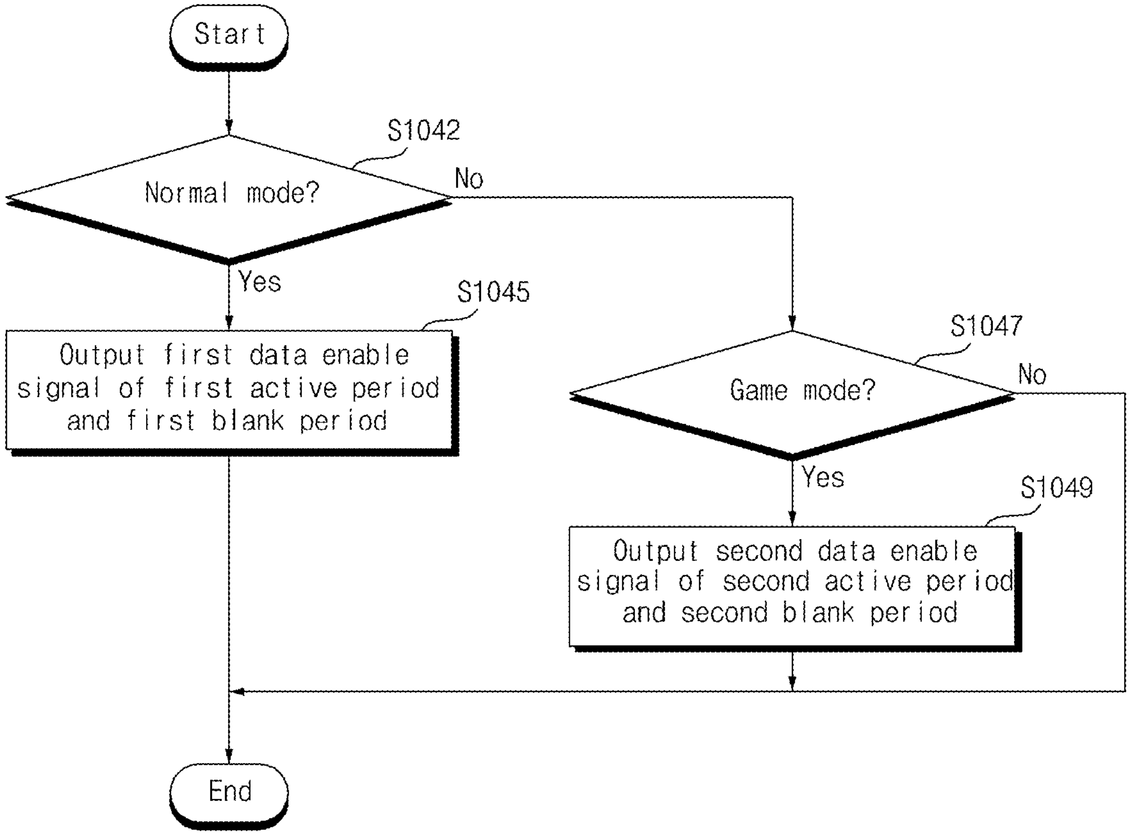
FIG. 10B is a flowchart showing another example of the operating method of an image display apparatus according to an embodiment of the present disclosure.

FIG. 10B is a flowchart showing another example of the operating method of an image display apparatus according to an embodiment of the present disclosure.

Referring to the figure, the signal processing device 170 according to an embodiment of the present disclosure can be configured to determine which the image display mode is the normal mode (S1042), and in response to the image display mode being the normal mode, the signal processing device 170 can be configured to output the first data enable signal DE corresponding to the first active period HA and the first blank period HB (S1045).

Next, the signal processing device 170 can be configured to determine which the image display mode is the game mode (S1047), and in response to the image display mode being the game mode, the signal processing device 170 can be configured to output the second data enable signal DE corresponding to the second active period HA and the second blank period HB (S1049).

At this time, the length of the second active period HA can be greater than the length of the first active period HA, and the length of the second blank period HB can be less than the length of the first blank period HB. Accordingly, the data enable signal DE is changed based on the image display mode to enhance the grayscale expression power when displaying the image.

Meanwhile, the signal processing device 170 can be configured to control the data bit of the R, G, and B data output in response to the game mode to be greater than the data bit of the R, G, and B data output in response to the normal mode. Accordingly, the grayscale expression power in response to the game mode can be enhanced compared to the normal mode.

Meanwhile, the signal processing device 170 can be configured to output the second data enable signal DE corresponding to the second active period HA and the second blank period HB in response to the image display mode being the game mode and the frequency of the vertical synchronization signal corresponding to a frequency of a first vertical synchronization signal.

Meanwhile, the signal processing device 170 can be configured to output a third data enable signal DE corresponding to a third active period HA and a third blank period HB in response to the image display mode being the game mode and the frequency of the vertical synchronization signal corresponding to a frequency of a second vertical synchronization signal higher than the frequency of the first vertical synchronization signal.

At this time, a length of the third active period HA can be greater than the length of the second active period HA, and a length of the third blank period HB can be less than the length of the second blank period HB. Accordingly, the data enable signal DE is changed based on the image display mode to enhance the grayscale expression power when displaying the image.

Figure 10C:
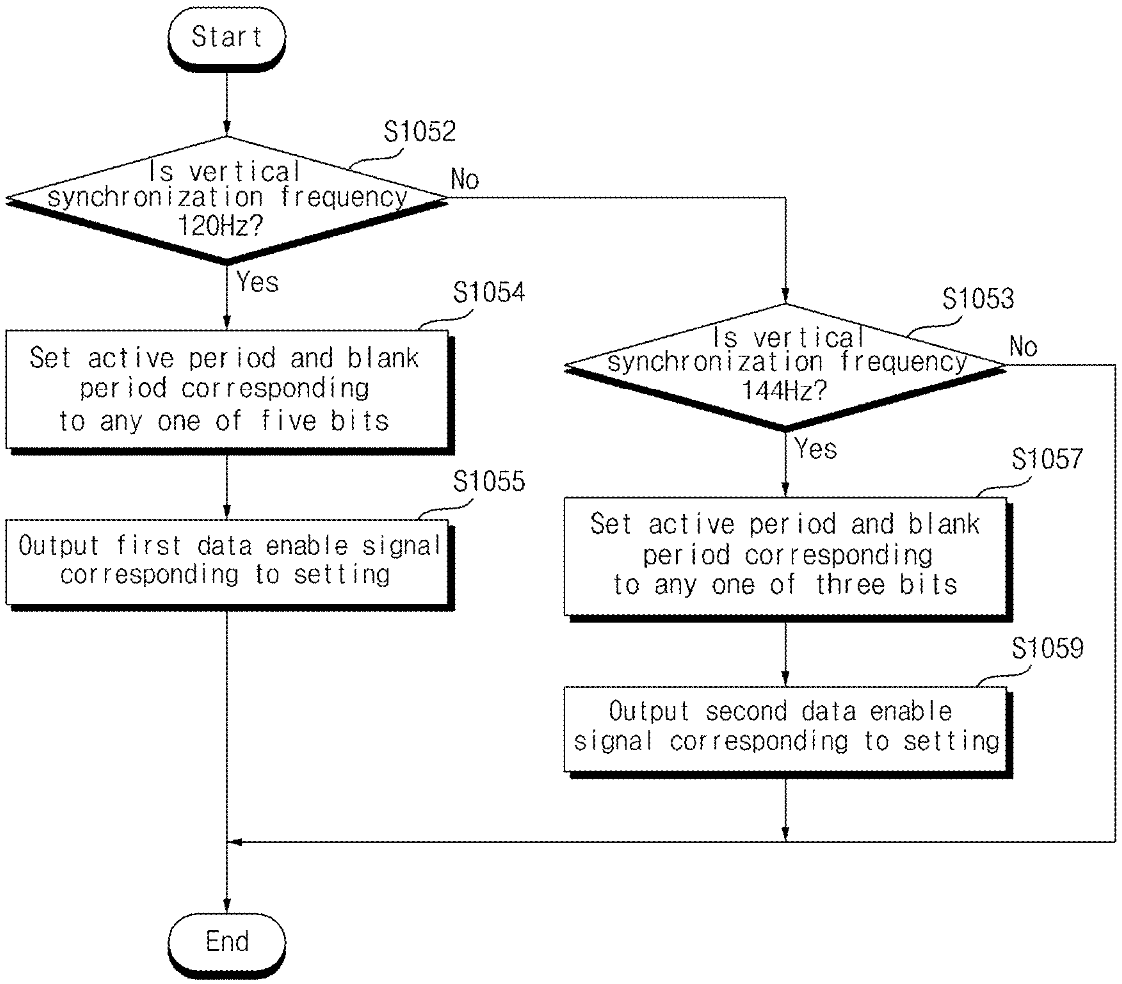
FIG. 10C is a flowchart showing yet another example of the operating method of an image display apparatus according to an embodiment of the present disclosure.

FIG. 10C is a flowchart showing yet another example of the operating method of an image display apparatus according to an embodiment of the present disclosure.

Referring to the figure, the signal processing device 170 according to an embodiment of the present disclosure can be configured to determine which the frequency of the vertical synchronization signal of the image signal is the frequency of the first vertical synchronization signal when transmitting the image signal the R, G, and B data to the timing controller 232 (S1052), and set a length of an active period HA or a length of a blank period HB in which the data bit of the image signal corresponds to one of a first number of bits when the frequency of the vertical synchronization signal of the image signal is the frequency of the first vertical synchronization signal (S1054).

In addition, the signal processing device 170 according to an embodiment of the present disclosure can be configured to output the first data enable signal DE corresponding to the length of the active period HA or the length of the blank period HB set in step 1054 (S1055).

In other words, the signal processing device 170 can be configured to output the first data enable signal DE corresponding to the frequency of the first vertical synchronization signal, and when the data bit of the image signal is one of a first bit, a second bit, a third bit, a fourth bit, and a fifth bit, set a length of an active period HA or a length of a blank period HB corresponding to the bit.

At this time, the frequency of the first vertical synchronization signal can be 120 Hz, the first number of bits can be 5 bits, and the first bit, the second bit, the third bit, the fourth bit, and the fifth bit can be 10 bits, 11 bits, 12 bits, 13 bits, and 14 bits, respectively.

In other words, the signal processing device 170 according to an embodiment of the present disclosure can be configured to output the first data enable signal DE by changing the length of the active period HA or the length of the blank period HB when the frequency of the vertical synchronization signal of the image signal is 120 Hz.

At this time, the first data enable signal DE can be a data enable signal corresponding to any one bit of 10 bits, 11 bits, 12 bits, 13 bits, and 14 bits.

Accordingly, the data enable signal DE is changed based on the frequency of the vertical synchronization signal to enhance the grayscale expression power when displaying the image.

Meanwhile, in step 1052 (S1052), the signal processing device 170 can be configured to determine which the frequency of the vertical synchronization signal of the image signal is a frequency of a second vertical synchronization signal higher than the frequency of the first vertical synchronization signal when the frequency of the vertical synchronization signal of the image signal is not the frequency of the first synchronization signal (S1053), and when of the frequency the vertical synchronization signal of the image signal is the frequency of the second vertical synchronization signal, set a length of an active period HA or a length of a blank period HB corresponding to one of bits of a second number less than the first number (S1057).

In addition, the signal processing device 170 according to an embodiment of the present disclosure can be configured to output the second data enable signal DE corresponding to the length of the active period HA or the length of the blank period HB set in step 1057 (S1059).

In other words, the signal processing device 170 can be configured to output the second data enable signal DE corresponding to the frequency of the second vertical synchronization signal, and when the data bit of the image signal is one of the first bit, the second bit, and the third bit, set a length of the active period HA or a length of the blank period HB corresponding to the bit.

At this time, the frequency of the second vertical synchronization signal can be 144 Hz, the second number of bits can be 3 bits, and the first bit, the second bit, and the third bit can be 10 bits, 11 bits, and 12 bits, respectively.

In other words, the signal processing device 170 according to an embodiment of the present disclosure can be configured to output the second data enable signal DE by changing the length of the active period HA or the length of the blank period HB when the frequency of the vertical synchronization signal of the image signal is 144 Hz.

At this time, the second data enable signal DE can be a data enable signal corresponding to any one bit of 10 bits, 11 bits, and 12 bits.

Accordingly, the data enable signal DE is changed based on the frequency of the vertical synchronization signal to enhance the grayscale expression power when displaying the image.

Figure 10D:
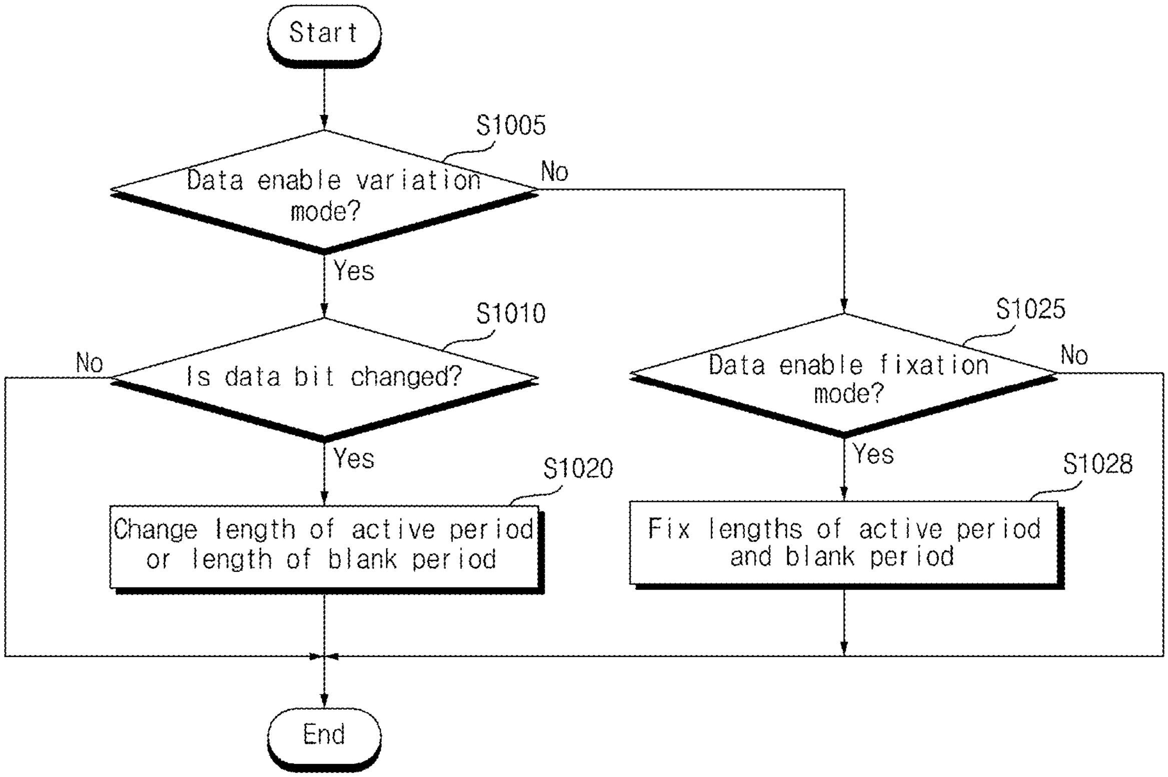
FIG. 10D is a flowchart showing still yet another example of the operating method of an image display apparatus according to an embodiment of the present disclosure.

FIG. 10D is a flowchart showing still yet another example of the operating method of an image display apparatus according to an embodiment of the present disclosure.

Referring to the figure, the signal processing device 170 according to an embodiment of the present disclosure can be configured to determine which the current mode is the data enable variation mode requiring the variation of the data bit (S1005), and when the current mode is the data enable variation mode, determine which changing the data bit is required when transmitting the image signal including the R, G, and B data to the timing controller 232 (S1010), and while changing the data bit is required, the signal processing device 170 is configured to change the length of the active period HA or the length of the blank period HB of the data enable signal DE (S1020).

For example, the signal processing device 170 can be configured to determine which the current mode is the data enable variation mode and changing the data bit is required, when the peak luminance of the image signal is changed, which is equal to or more than a reference peak luminance (e.g., xxxx nit).

Meanwhile, the signal processing device 170 can be configured to determine which the current mode is the data enable variation mode and changing the data bit is required when the frequency of the vertical synchronization signal of the image signal is changed and increased.

Meanwhile, the signal processing device 170 can be configured to determine which the current mode is the data enable variation mode and changing the data bit is required in response to the image display mode being changed from the normal mode to the game mode.

Meanwhile, when the current mode is the data enable variation mode and changing the data bit is required, the signal processing device 170 can be configured to change the length of the active period HA or the length of the blank period HB in the data enable signal DE. Accordingly, the data enable signal DE is changed according to the data enable variation mode to enhance the grayscale expression power when displaying the image.

Meanwhile, when the current mode is not the data enable variation mode in step 1005 (S1005), the signal processing device 170 can be configured to determine which the current mode is the data enable fixation mode (S1025), and when the current mode is the data enable fixation mode, the signal processing device 170 is configured to enter the data enable fixation mode to fix the length of the active period HA or the length of the blank period HB (S1028). Accordingly, the signal processing device 170 can operate in the data enable fixation mode.

For example, when the signal processing device 170 is configured to determine that changing the data bit is not required, the signal processing device 170 is configured to enter the data enable fixation mode to control the 4 byte mode or the 5 byte mode of 120 Hx to be performed or the 4 byte mode of 144 Hx to be performed as in FIG. 9C.

FIGS. 11A to 14B are diagrams referred to in the description of FIGS. 10A to 10D.

Figure 11B:
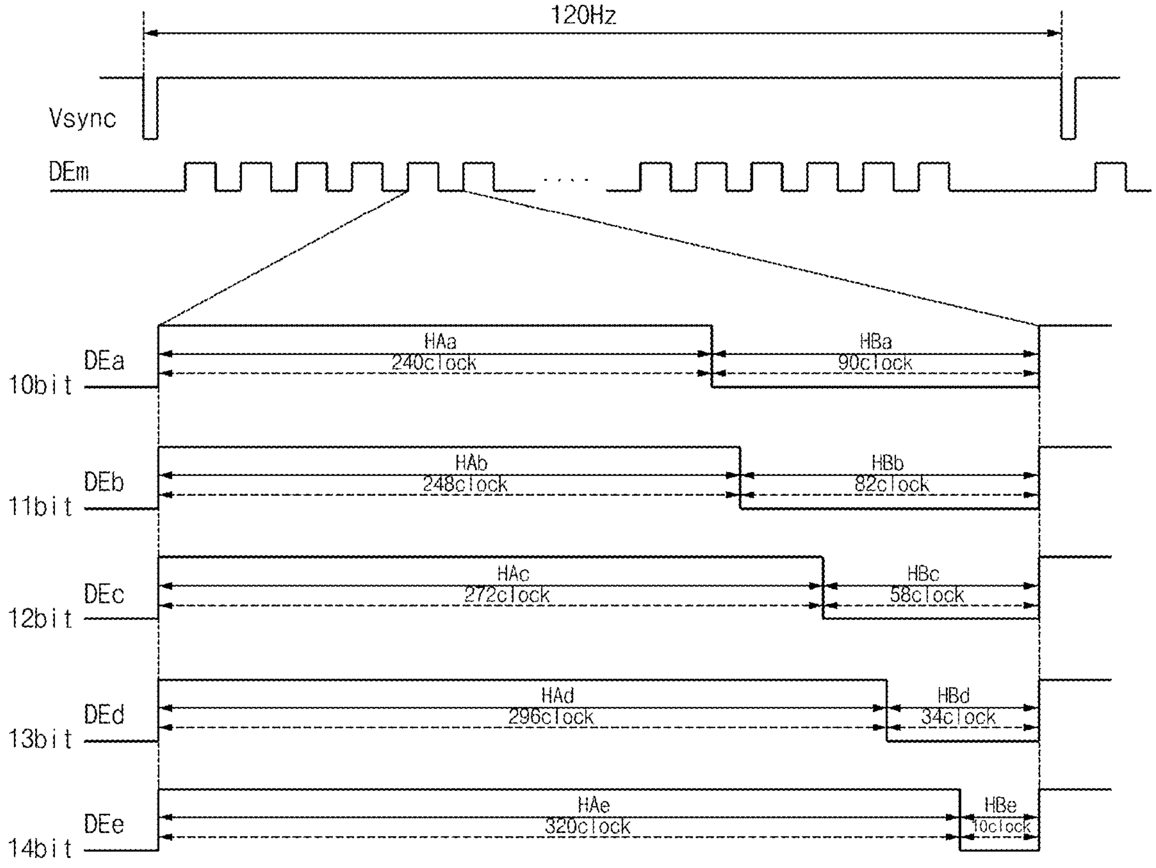

First, FIGS. 11A and 11B illustrate examples of various transmission bits when the frequency of the vertical synchronization signal of the image signal is the frequency of the first vertical synchronization signal.

FIG. 11A shows a plurality of transmission bits when the frequency of the first vertical synchronization signal is, for example 120 Hz.

Referring to the figure, the signal processing device 170 can be configured to transmit the image signal at any one data transmission bit of 10 bits, 11 bits, 12 bits, 13 bits, and 14 bits when the frequency of the first vertical synchronization signal is 120 Hz.

For example, when the data transmission bit of the image signal is set to 10 bits, the signal processing device 170 can be configured to set the pixel clock to 89.1 MHZ, and set the active period, the blank period, and the total period of Horizontal to 240, 90, and 330 clocks, respectively, and set the active period, the blank period, and the total period of Vertical to 2160, 90, and 2250 clocks, respectively.

Meanwhile, when the data transmission bit of the image signal is set to 11 bits, the signal processing device 170 can be configured to set the pixel clock to 89.1 MHz, and set the active period, the blank period, and the total period of Horizontal to 248, 82, and 330 clocks, respectively, and set the active period, the blank period, and the total period of Vertical to 2160, 90, and 2250 clocks, respectively.

Meanwhile, when the data transmission bit of the image signal is set to 12 bits, the signal processing device 170 can be configured to set the pixel clock to 89.1 MHz, and set the active period, the blank period, and the total period of Horizontal to 272, 58, and 330 clocks, respectively, and set the active period, the blank period, and the total period of Vertical to 2160, 90, and 2250 clocks, respectively.

Meanwhile, when the data transmission bit of the image signal is set to 13 bits, the signal processing device 170 can be configured to set the pixel clock to 89.1 MHz, and set the active period, the blank period, and the total period of Horizontal to 296, 34, and 330 clocks, respectively, and set the active period, the blank period, and the total period of Vertical to 2160, 90, and 2250 clocks, respectively.

Meanwhile, when the data transmission bit of the image signal is set to 14 bits, the signal processing device 170 can be configured to set the pixel clock to 89.1 MHz, and set the active period, the blank period, and the total period of Horizontal to 320, 10, and 330 clocks, respectively, and set the active period, the blank period, and the total period of Vertical to 2160, 90, and 2250 clocks, respectively.

That is, the signal processing device 170 can be configured to increase the length of the active period HA of the data enable signal DE or decrease the length of the blank period HB as the data bit of the image signal increases.

For example, the signal processing device 170 can be configured to increase the active period of Horizontal by 8 clocks or 24 clocks and decrease the blank period by 8 clocks or 24 clocks as the data bit of the image signal increases by 1 bit.

Meanwhile, unlike the figure, when the data transmission bit of the image signal is set to 15 bits, the signal processing device 170 can be configured to set the pixel clock to 89.1 MHZ, and set the active period, the blank period, and the total period of Horizontal to 328, 2, and 330 clocks, respectively, and set the active period, the blank period, and the total period of Vertical to 2160, 90, and 2250 clocks, respectively.

FIG. 11B is a view referred to in the description of FIG. 11A.

Referring to the figure, when the frequency of the first vertical synchronization signal is 120 Hz, the signal processing device 170 can be configured to output a plurality of data enable signals DEm in which the active period or the blank period of Horizontal is changed.

For example, when the signal processing device 170 sets the data transmission bit of the image signal to 10 bits, the active period, the blank period, and the total period of Horizontal can be configured to output data enable signals DE1 corresponding to 240, 90, and 330 clocks, respectively.

Accordingly, the timing controller 232 can be configured to extract the R, G, and B data from the image signal during a period of 240 clocks in the data enable signal DE1.

As another example, when the signal processing device 170 sets the data transmission bit of the image signal to 11 bits, the active period, the blank period, and the total period of Horizontal can be configured to output data enable signals DE2 corresponding to 248, 82, and 330 clocks, respectively.

Accordingly, the timing controller 232 be can configured to extract the R, G, and B data from the image signal during a period of 248 clocks in the data enable signal DE2.

As yet another example, when the signal processing device 170 sets the data transmission bit of the image signal to 12 bits, the active period, the blank period, and the total period of Horizontal can be configured to output data enable signals DE3 corresponding to 272, 58, and 330 clocks, respectively.

Accordingly, the timing controller 232 can be configured to extract the R, G, and B data from the image signal during a period of 272 clocks in the data enable signal DE3.

As still yet another example, when the signal processing device 170 sets the data transmission bit of the image signal to 13 bits, the active period, the blank period, and the total period of Horizontal can be configured to output data enable signals DE4 corresponding to 296, 34, and 330 clocks, respectively.

Accordingly, the timing controller 232 can be configured to extract the R, G, and B data from the image signal during a period of 296 clocks in the data enable signal DE4.

As further yet another example, when the signal processing device 170 sets the data transmission bit of the image signal to 14 bits, the active period, the blank period, and the total period of Horizontal can be configured to output data enable signals DE5 corresponding to 320, 10, and 330 clocks, respectively.

Accordingly, the timing controller 232 can be configured to extract the R, G, and B data from the image signal during a period of 320 clocks in a data enable signal DE5.

Figures 12A, 12B:
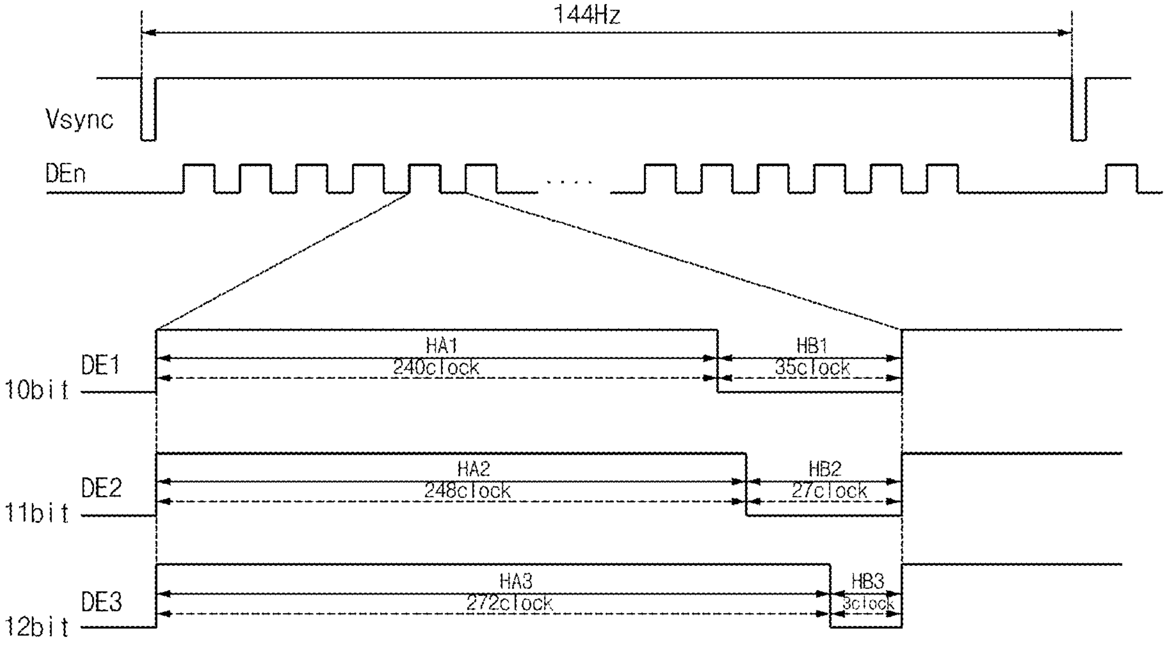

Next, FIGS. 12A and 12B illustrate examples of various transmission bits when the frequency of the vertical synchronization signal of the image signal is the frequency of the second vertical synchronization signal.

FIG. 12A shows a plurality of transmission bits when the frequency of the second vertical synchronization signal is, for example 144 Hz.

Referring to the figure, the signal processing device 170 can control the image signal to be transmitted at any one data transmission bit of 10 bits, 11 bits, and 12 bits when the frequency of the second vertical synchronization signal is 144 Hz.

For example, when the data transmission bit of the image signal is set to 10 bits, the pixel clock can be set to 89.1 MHZ, and the signal processing device 170 can be configured to set the active period, the blank period, and the total period of Horizontal to 240, 35, and 275 clocks, respectively, and set the active period, the blank period, and the total period of Vertical to 2160, 90, and 2250 clocks, respectively.

Meanwhile, when the data transmission bit of the image signal is set to 11 bits, the signal processing device 170 can be configured to set the pixel clock to 89.1 MHZ, and set the active period, the blank period, and the total period of Horizontal to 248, 27, and 275 clocks, respectively, and set the active period, the blank period, and the total period of Vertical to 2160, 90, and 2250 clocks, respectively.

Meanwhile, when the data transmission bit of the image signal is set to 12 bits, the signal processing device 170 can be configured to set the pixel clock to 89.1 MHZ, and set the active period, the blank period, and the total period of Horizontal to 272, 3, and 275 clocks, respectively, and set the active period, the blank period, and the total period of Vertical to 2160, 90, and 2250 clocks, respectively.

That is, the signal processing device 170 can be configured to increase the length of the active period HA of the data enable signal DE or decrease the length of the blank period HB as the data bit of the image signal increases.

For example, the signal processing device 170 can be configured to increase the active period of Horizontal by 8 clocks or 24 clocks and decrease the blank period by 8 clocks or 24 clocks as the data bit of the image signal increases by 1 bit.

FIG. 12B is a view referred to in the description of FIG. 12A.

Referring to the figure, when the frequency of the second vertical synchronization signal is 144 Hz, the signal processing device 170 can be configured to output a plurality of data enable signals DEn in which the active period or the blank period of Horizontal is changed.

For example, when the signal processing device 170 sets the data transmission bit of the image signal to 10 bits, the active period, the blank period, and the total period of Horizontal can be configured to output data enable signals DE1 corresponding to 240, 35, and 275 clocks, respectively.

Accordingly, the timing controller 232 can be configured to extract the R, G, and B data from the image signal during a period of 240 clocks in the data enable signal DE1.

As another example, when the signal processing device 170 sets the data transmission bit of the image signal to 11 bits, the active period, the blank period, and the total period of Horizontal can be configured to output data enable signals DE2 corresponding to 248, 27, and 275 clocks, respectively.

Accordingly, the timing controller 232 can be configured to extract the R, G, and B data from the image signal during a period of 248 clocks in the data enable signal DE2.

As yet another example, when the signal processing device 170 sets the data transmission bit of the image signal to 12 bits, the active period, the blank period, and the total period of Horizontal can be configured to output data enable signals DE3 corresponding to 272, 3, and 275 clocks, respectively.

FIG. 13A shows a data format of a data transmission bit of 10 bits to 11 bits.

Referring to the figure, 10-bit R, G, and B data can be transmitted by Rn[0] to Rn[9], Gn[0] to Gn[9], and Bn[0] to Bn[9] according to the 4 byte mode when transmitting a 10-bit image signal.

That is, the signal processing device 170 can be configured to arrange Rn[2] to Rn[9] in Byte0, arrange Gn[2] to Gn[9] in Byte1, arrange Bn[2] to Bn[9] in Byte2, and arrange Rn[0], Rn[1], Gn[0], Gn[1], Bn[0], and Bn[1] in Byte3, among 4 bytes.

At this time, in response to the data enable signal, the clock of the active period of Horizontal can be 240 clocks.

Next, the signal processing device 170 can be configured to transmit 10-bit R, G, and B data by Rn[0] to Rn[10], Gn[0] to Gn[10], and Bn[0] to Bn[10] according to the 4 byte mode when transmitting an 11-bit image signal.

That is, the signal processing device 170 can be configured to arrange Rn[3] to Rn[10] in Byte0, arrange Gn[3] to Gn[10] in Byte1, arrange Bn[3] to Bn[10] in Byte2, and arrange Rn[1], Rn[2], Gn[1], Gn[2], Bn[1], and Bn[2] in Byte3, among 4 bytes.

Meanwhile, the signal processing device 170 can be configured to further arrange Rn[0] and Gn[0] in Byte3.

Meanwhile, the signal processing device 170 can be configured to extend the active period of the data enable signal from 240 clocks to 248 clocks.

Accordingly, the signal processing device 170 can be configured to arrange R0[0] to R0 in Byte0 to Byte3 during a period of 240 clocks to 248 clocks.

Consequently, the grayscale expression power when displaying the image can be enhanced without changing the transmission lane of the image signal due to the variation of the active period of the data enable signal.

FIG. 13B shows a data format of a data transmission bit of 12 bits.

Referring to the figure, 12-bit R, G, and B data can be transmitted by Rn[0] to Rn[11], Gn[0] to Gn[11], and Bn[0] to Bn[11] according to the 4 byte mode when transmitting a 12-bit image signal.

That is, the signal processing device 170 can be configured to arrange Rn[4] to Rn[11] in Byte0, arrange Gn[4] to Gn[11] in Byte1, arrange Bn[4] to Bn[11] in Byte2, and arrange Rn[2], Rn[3], Gn[2], Gn[3], Bn[2], and Bn[3] in Byte3, among 4 bytes.

Meanwhile, the signal processing device 170 can be configured to further arrange Rn[1] and Gn[1] in Byte3.

Meanwhile, the signal processing device 170 can be configured to extend the active period of the data enable signal from 240 clocks to 272 clocks.

Accordingly, the signal processing device 170 can be configured to arrange R1[0] to R1 in Byte0 to Byte3 during a period of 240 clocks to 248 clocks.

Meanwhile, the signal processing device 170 can be configured to arrange B0[0] to B0 in Byte0 to Byte3 during a period of 249 clocks to 256 clocks.

Meanwhile, the signal processing device 170 can be configured to arrange G0[0] to G0 in Byte0 to Byte3 during a period of 257 clocks to 264 clocks.

Meanwhile, the signal processing device 170 can be configured to arrange R0[0] to R0 in Byte0 to Byte3 during a period of 265 clocks to 272 clocks.

Accordingly, the signal processing device 170 can be configured to arrange R0[0] to R0 in Byte0 to Byte3 for the data transmission bit of 12 bits using a period of 240 clocks to 272 clocks.

Consequently, the grayscale expression power when displaying the image can be enhanced without changing the transmission lane of the image signal due to the variation of the active period of the data enable signal.

Figure 14A:
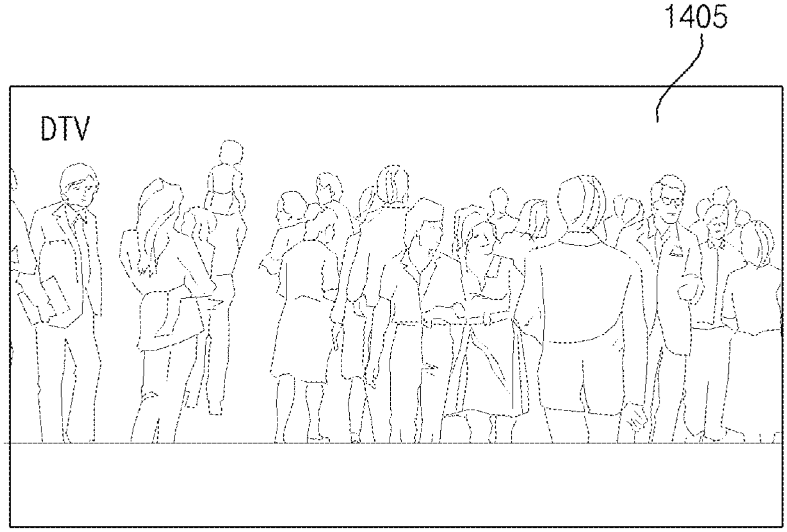

FIG. 14A shows an example of image display in the normal mode.

Referring to the figure, the signal processing device 170 can be configured to output the first data enable signal DE corresponding to the first active period HA and the first blank period HB in response to the image display mode being the normal mode.

Accordingly, the timing controller 232 can be configured to extract the R, G, and B data in the image signal based on the first data enable signal DE and display a first image 1405 based on the R, G, and B data.

At this time, the normal mode can correspond to a broadcast display mode. That is the first image 1405 can be a broadcast image.

Figure 14B:
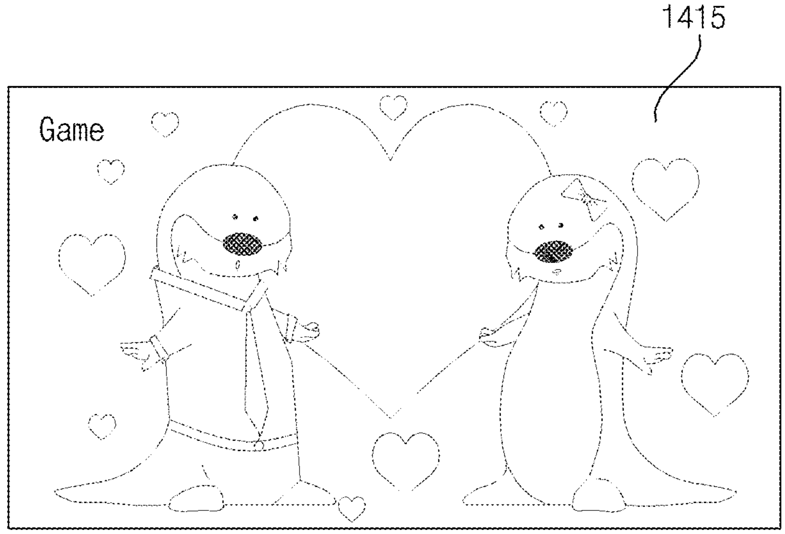

FIG. 14B shows an example of image display in the game mode.

Referring to the figure, the signal processing device 170 can be configured to output the second data enable signal DE corresponding to the second active period HA and the second blank period HB in response to the image display mode being the game mode.

At this time, it is preferable that the length of the second active period HA is greater than the length of the first active period HA, and the length of the second blank period HB is less than the length of the first blank period HB.

Accordingly, the timing controller 232 can be configured to extract the R, G, and B data in the image signal based on the second data enable signal DE and a second image 1415 which is a game image to be displayed based on the R, G, and B data.

Accordingly, the grayscale expression power when displaying the image can be enhanced without changing the transmission lane of the image signal.

As described above, according to an embodiment of the present disclosure, an image display apparatus includes: a panel; a signal processing device configured to process an input image and output an image signal; and a timing controller configured to drive the panel based on the image signal from the signal processing device, and the signal processing device is configured to output a data enable signal divided into an active period and a blank period, and change a length of the active period or a length of the blank interval in response to a data bit of the image signal being changed. Accordingly, a grayscale expression when power displaying the image can be enhanced. In particular, the grayscale expression power when displaying the image can be enhanced without changing the transmission lane of the image signal.

Meanwhile, the signal processing device can be configured to output a first data enable signal corresponding to a first active period and a first blank period in response to an image display mode being a normal mode, and output a second data enable signal corresponding to a second active period and a second blank period in response to the image display mode being a game mode, and a length of the second active period can be greater than a length of the first active period and a length of the second blank period can be less than a length of the first blank period. Accordingly, the data enable signal is changed based on the image display mode to enhance the grayscale expression power when displaying the image.

Meanwhile, the signal processing device can be configured to output the first data enable signal corresponding to the first active period and the first blank period to display an image having a peak luminance of a first level in the panel, and output the second data enable signal corresponding to the second active period and the second blank period to display an image having a peak luminance of a second level higher than the first level in the panel, and the length of the second active period can be greater than the length of the first active period and the length of the second blank period can be less than the length of the first blank period. Accordingly, the data enable signal is changed to enhance the grayscale expression power when displaying the image.

Meanwhile, the signal processing device can be configured to output a first data enable signal corresponding to a frequency of a first vertical synchronization signal, and in response to the data bit of the image signal being one of a first bit, a second bit, a third bit, a fourth bit, and a fifth bit, set a length of the active period or a length of the blank corresponding to the corresponding bit. Accordingly, the data enable signal is changed based on the frequency of the vertical synchronization signal to enhance the grayscale expression power when displaying the image.

Meanwhile, the signal processing device can be configured to, in response to a frequency of a vertical synchronization signal corresponding to the frequency of the first vertical synchronization signal, set a length of the active period or a length of the blank period in which the data bit of the image signal corresponds to one of a first number of bits, and in response to the frequency of the vertical synchronization signal corresponding to a frequency of a second vertical synchronization signal higher than the frequency of the first vertical synchronization signal, set a length of the active period or a length of the blank period in which the data bit of the image signal corresponds to one of bits of a second number less than the first number. Accordingly, the data enable signal is changed based on the frequency of the vertical synchronization signal to enhance the grayscale expression power when displaying the image.

Meanwhile, the signal processing device can be configured to output a second data enable signal corresponding to the frequency of the second vertical synchronization signal, and in response to the data bit of the image signal being one of the first bit, the second bit, and the third bit, set a length of the active period or a length of the blank corresponding to the corresponding bit. Accordingly, the data enable signal is changed based on the frequency of the vertical synchronization signal to enhance the grayscale expression power when displaying the image.

Meanwhile, the signal processing device can be configured to decrease the length of the blank period of the data enable signal as the frequency of the vertical synchronization signal increases. Accordingly, the data enable signal is changed based on the frequency of the vertical synchronization signal to enhance the grayscale expression power when displaying the image.

Meanwhile, the signal processing device can be configured to increase the length of the active period of the data enable signal or decrease the length of the blank period as the data bit of the image signal increases. Accordingly, the data enable signal is changed to enhance the grayscale expression power when displaying the image.

Meanwhile, the signal processing device is configured to change the length of the active period or the length of the blank period in response to a data enable variation mode. Accordingly, the data enable signal is changed according to the data enable variation mode to enhance the grayscale expression power when displaying the image.

Meanwhile, the signal processing device can be configured to fix the length of the active period or the length of the blank period in response to a data enable fixation mode. Accordingly, the signal processing device 170 can operate in the data enable fixation mode.

Meanwhile, the signal processing device can be configured to output the image signal including R, G, and B data in response to the length of the active period of the data enable signal. Accordingly, the grayscale expression power when displaying the image can be enhanced.

Meanwhile, the signal processing device can be configured to increase a data bit of the R, G, and B data as the length of the active period of the data enable signal increases. Accordingly, the grayscale expression power when displaying the image can be enhanced.

According to another embodiment of the present disclosure, an image display apparatus includes: a panel; a signal processing device configured to process an input image and output an image signal; and a timing controller configured to drive the panel based on the image signal from the signal processing device, and the signal processing device is configured to output a first data enable signal corresponding to a first active period and a first blank period in response to an image display mode being a normal mode, and output a second data enable signal corresponding to a second active period and a second blank period in response to the image display mode being a game mode, and a length of the second active period is greater than a length of the first active period and a length of the second blank period is less than a length of the first blank period. Accordingly, the data enable signal is changed based on the image display mode to enhance the grayscale expression power when displaying the image. In particular, the grayscale expression power when displaying the image can be enhanced without changing the transmission lane of the image signal.

Meanwhile, the signal processing device can be configured to control a data bit of R, G, and B data output in response to the game mode to be greater than a data bit of R, G, and B data output in response to the normal mode. Accordingly, the grayscale expression power in response to the game mode can be enhanced compared to the normal mode.

Meanwhile, the signal processing device can be configured to output the second data enable signal corresponding to the second active period and the second blank period in response to the image display mode being the game mode and a frequency of a vertical synchronization signal corresponding to a first vertical synchronization signal, and output a third data enable signal corresponding to a third active period and a third blank period in response to the image display mode being the game mode and the frequency of the vertical synchronization signal corresponding to a frequency of a second vertical synchronization signal higher than the frequency of the first vertical synchronization signal, and a length of the third active period can be greater than the length of the first active period and a length of the third blank period can be less than the length of the second blank period. Accordingly, the data enable signal is changed based on the image display mode to enhance the grayscale expression power when displaying the image.

According to yet another embodiment of the present disclosure, an image display apparatus includes: a panel; a signal processing device configured to process an input image and output an image signal; and a timing controller configured to drive the panel based on the image signal from the signal processing device, and the signal processing device is configured to output a data enable signal divided into an active period and a blank period, change a length of the active period or a length of the blank period in response to a data enable variation mode, and fix the length of the active period or the length of the blank period in response to a data enable fixation mode. Accordingly, the grayscale expression power when displaying the image can be enhanced based on the data enable variation mode. In particular, the grayscale expression power when displaying the image can be enhanced without changing the transmission lane of the image signal.

Meanwhile, the signal processing device can be configured to output a first data enable signal corresponding to a first active period and a first blank period in response to the data enable variation mode and an image display mode being a normal mode, and output a second data enable signal corresponding to a second active period and a second blank period in response to the data enable variation mode and the image display mode being a game mode, and a length of the second active period can be greater than a length of the first active period and a length of the second blank period can be less than a length of the first blank period. Accordingly, the grayscale expression power when displaying the image can be enhanced based on the data enable variation mode.

Meanwhile, in response to the data enable variation model, the signal processing device can be configured to output a first data enable signal corresponding to a frequency of a first vertical synchronization signal, and in response to the data bit of the image signal being one of a first bit, a second bit, a third bit, a fourth bit, and a fifth bit, set a length of the active period or a length of the blank corresponding to the corresponding bit. Accordingly, the grayscale expression power when displaying the image can be enhanced based on the data enable variation mode.

While the preferred embodiments of the present disclosure have been illustrated and described above, the present disclosure is not limited to the aforementioned specific embodiments, various modifications can be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. An image display apparatus comprising:

a panel;

a signal processing device configured to process an input image and output an image signal; and a timing controller configured to drive the panel based on the image signal from the signal processing device, wherein the signal processing device is configured to output a data enable signal divided into an active period and a blank period, and change a length of the active period or a length of the blank period in response to a data bit of the image signal being changed, and wherein the signal processing device is configured to:

output a first data enable signal corresponding to a first active period and a first blank period to display an image having a peak luminance of a first level in the panel, and output a second data enable signal corresponding to a second active period and a second blank period to display an image having a peak luminance of a second level higher than the first level in the panel, and wherein a length of the second active period is greater than a length of the first active period and a length of the second blank period is less than a length of the first blank period.

2. The image display apparatus of claim 1, wherein the signal processing device is configured to:

output the first data enable signal corresponding to the first active period and the first blank period in response to an image display mode being a normal mode, and output the second data enable signal corresponding to the second active period and the second blank period in response to the image display mode being a game mode.

3. The image display apparatus of claim 1, wherein the signal processing device is configured to:

output the first data enable signal corresponding to a frequency of a first vertical synchronization signal, and in response to the data bit of the image signal being one of a first bit, a second bit, a third bit, a fourth bit, and a fifth bit, set the length of the active period or the length of the blank period corresponding to the first bit, the second bit, the third bit, the fourth bit and the fifth bit.

4. The image display apparatus of claim 3, wherein the signal processing device is configured to:

in response to a frequency of a vertical synchronization signal corresponding to the frequency of the first vertical synchronization signal, set the length of the active period or the length of the blank period in which the data bit of the image signal corresponds to one of a first number of bits, and in response to the frequency of the vertical synchronization signal corresponding to a frequency of a second vertical synchronization signal higher than the frequency of the first vertical synchronization signal, set the length of the active period or the length of the blank period in which the data bit of the image signal corresponds to one of bits of a second number less than the first number of bits.

5. The image display apparatus of claim 4, wherein the signal processing device is configured to:

output the second data enable signal corresponding to the frequency of the second vertical synchronization signal, and in response to the data bit of the image signal being one of the first bit, the second bit, and the third bit, set the length of the active period or the length of the blank period corresponding to the first bit, the second bit, and the third bit.

6. The image display apparatus of claim 4, wherein the signal processing device is configured to decrease the length of the blank period of the data enable signal as the frequency of the vertical synchronization signal increases.

7. The image display apparatus of claim 1, wherein the signal processing device is configured to increase the length of the active period of the data enable signal or decrease the length of the blank period as the data bit of the image signal increases.

8. The image display apparatus of claim 1, wherein the signal processing device is configured to change the length of the active period or the length of the blank period in response to a data enable variation mode.

9. The image display apparatus of claim 8, wherein the signal processing device is configured to fix the length of the active period or the length of the blank period in response to a data enable fixation mode.

10. The image display apparatus of claim 1, wherein the signal processing device is configured to output the image signal including R, G, and B data in response to the length of the active period of the data enable signal.

11. The image display apparatus of claim 10, wherein the signal processing device is configured to increase a data bit of the R, G, and B data as the length of the active period of the data enable signal increases.

12. An image display apparatus comprising:

a panel;

a signal processing device configured to process an input image and output an image signal; and a timing controller configured to drive the panel based on the image signal from the signal processing device, wherein the signal processing device is configured to:

output a first data enable signal corresponding to a first active period and a first blank period in response to an image display mode being a normal mode, and output a second data enable signal corresponding to a second active period and a second blank period in response to the image display mode being a game mode, wherein a length of the second active period is greater than a length of the first active period and a length of the second blank period is less than a length of the first blank period, and wherein the signal processing device is configured to control a data bit of R, G, and B data output in response to the game mode to be greater than a data bit of R, G, and B data output in response to the normal mode.

13. The image display apparatus of claim 12, wherein the signal processing device is configured to:

output the second data enable signal corresponding to the second active period and the second blank period in response to the image display mode being the game mode and a frequency of a vertical synchronization signal corresponding to a first vertical synchronization signal, and output a third data enable signal corresponding to a third active period and a third blank period in response to the image display mode being the game mode and the frequency of the vertical synchronization signal corresponding to a frequency of a second vertical synchronization signal higher than the frequency of the first vertical synchronization signal, and wherein a length of the third active period is greater than the length of the first active period and a length of the third blank period is less than the length of the second blank period.

14. An image display apparatus comprising:

a panel;

a signal processing device configured to process an input image and output an image signal; and a timing controller configured to drive the panel based on the image signal from the signal processing device, wherein the signal processing device is configured to:

output a data enable signal divided into an active period and a blank period, change a length of the active period or a length of the blank period in response to a data enable variation mode, and fix the length of the active period or the length of the blank period in response to a data enable fixation mode, wherein the signal processing device is configured to:

output a first data enable signal corresponding to a first active period and a first blank period in response to the data enable variation mode and an image display mode being a normal mode, and output a second data enable signal corresponding to a second active period and a second blank period in response to the data enable variation mode and the image display mode being a game mode, and wherein a length of the second active period is greater than a length of the first active period and a length of the second blank period is less than a length of the first blank period.

15. The image display apparatus of claim 14, wherein the signal processing device is configured to:

in response to the data enable variation model, output the first data enable signal corresponding to a frequency of a first vertical synchronization signal, and in response to a data bit of the image signal being one of a first bit, a second bit, a third bit, a fourth bit, and a fifth bit, set the length of the active period or the length of the blank period the first bit, the second bit, the third bit, the fourth bit and the fifth bit.

16. The image display apparatus of claim 14, wherein the signal processing device is configured to:

output the first data enable signal corresponding to a frequency of a first vertical synchronization signal, and in response to a data bit of the image signal being one of a first bit, a second bit, a third bit, a fourth bit, and a fifth bit, set the length of the active period or the length of the blank period corresponding to the first bit, the second bit, the third bit, the fourth bit and the fifth bit.

17. The image display apparatus of claim 16, wherein the signal processing device is configured to:

in response to a frequency of a vertical synchronization signal corresponding to the frequency of the first vertical synchronization signal, set the length of the active period or the length of the blank period in which the data bit of the image signal corresponds to one of a first number of bits, and in response to the frequency of the vertical synchronization signal corresponding to a frequency of a second vertical synchronization signal higher than the frequency of the first vertical synchronization signal, set the length of the active period or the length of the blank period in which the data bit of the image signal corresponds to one of bits of a second number less than the first number of bits.

* * * * *